(12) United States Patent
Li et al.

(10) Patent No.: US 11,317,387 B2
(45) Date of Patent: Apr. 26, 2022

(54) UPLINK CONTROL INFORMATION TRANSMISSION METHOD AND APPARATUS

(71) Applicant: HUAWEI TECHNOLOGIES CO., LTD., Guangdong (CN)

(72) Inventors: Hua Li, Shanghai (CN); Yongzhao Cao, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 38 days.

(21) Appl. No.: 16/871,590

(22) Filed: May 11, 2020

(65) Prior Publication Data

US 2020/0275432 A1    Aug. 27, 2020

Related U.S. Application Data

(63) Continuation of application No. PCT/CN2018/107102, filed on Sep. 21, 2018.

(30) Foreign Application Priority Data

Nov. 17, 2017    (CN) .......................... 201711148190.1

(51) Int. Cl.
*H04W 72/04*    (2009.01)
*H04B 7/06*    (2006.01)
(Continued)

(52) U.S. Cl.
CPC ...... *H04W 72/0413* (2013.01); *H04B 7/0626* (2013.01); *H04L 1/1812* (2013.01); *H04L 5/0055* (2013.01)

(58) Field of Classification Search
CPC ............... H04L 1/1812; H04L 5/0055; H04W 72/0413; H04B 7/0626
See application file for complete search history.

(56) References Cited

U.S. PATENT DOCUMENTS 9,313,779 B2    4/2016    Han et al.
9,497,742 B2    11/2016    Gao et al.
(Continued)

FOREIGN PATENT DOCUMENTS

CN    102013938 A    4/2011
CN    102104467 A    6/2011
(Continued)

OTHER PUBLICATIONS

3GPP TS 38.212 V1.0.0 (Sep. 2017),3rd Generation Partnership Project,Technical Specification Group Radio Access Network,NR,Multiplexing and channel coding(Release 15), 28 pages.
(Continued)

*Primary Examiner* — Brian P Cox
(74) *Attorney, Agent, or Firm* — Fish & Richardson P.C.

(57) ABSTRACT

Example uplink control information transmission methods and apparatus are provided. One example method includes determining a quantity of resources for sending UCI by a terminal device based on first information. The first information includes scheduling information, a ratio of a quantity of bits of the UCI to a quantity of bits of data, a first preset parameter, a parameter β, a quantity of available resources of a PUSCH, and a parameter α. The terminal device sends the UCI to a network device based on the determined quantity of resources for sending the UCI.

17 Claims, 16 Drawing Sheets

A terminal device determines, based on first information, a quantity of resources for sending UCI — 201

The terminal device sends the UCI to a network device based on the determined quantity of resources for sending the UCI — 202

(51) Int. Cl.
*H04L 1/18* (2006.01)
*H04L 5/00* (2006.01)

(56) References Cited

U.S. PATENT DOCUMENTS

2017/0318575 A1   11/2017  Park et al.
2020/0068556 A1*  2/2020  Tiirola ................. H04L 5/0053

FOREIGN PATENT DOCUMENTS

| CN | 106559878 A | 4/2017 |
|---|---|---|
| CN | 107005374 A | 8/2017 |
| CN | 107027181 A | 8/2017 |
| CN | 109600210 A | 4/2019 |
| CN | 110741577 A | 1/2020 |
| EP | 3514998 A1 | 7/2019 |
| EP | 3028398 B1 | 10/2020 |
| JP | 2012516616 A | 7/2012 |
| RU | 2471290 C2 | 12/2012 |

OTHER PUBLICATIONS

PCT International Search Report and Written Opinion in International Application No. PCT/CN2018/107,102, dated Dec. 12, 2018, 13 pages (With English Translation).
Extended European Search Report issued in European Application No. 18877493.9 dated Oct. 27, 2020, 10 pages.
Huawei, HiSilicon, "On UCI multiplexing," 3GPP TSG RAN WG1 AH_NR#3, R1-1715404, Nagoya, Japan, Sep. 18-21, 2017, 9 pages.
NTT Docomo, Inc., "Views on UCI on sPUSCH," 3GPP TSG RAN WG1 #88, R1-1702786, Athens, Greece, Feb. 13-17, 2017, 7 pages.
Huawei, "CR to 38.212 capturing the Jan. 18 ad-hoc and RAN1#92 meeting agreements," 3GPP TSG RAN WG1 #92 R1-1803553, Athens, Greece, Feb. 26-Mar. 1, 2018, 37 page.
Office Action issued in Chinese Application No. 201711148190.1 dated May 26, 2021, 21 pages (with English translation).
Office Action issued in Japanese Application No. 2020-526878 dated Jun. 1, 2021, 7 pages (with English translation).
Office Action issued in Russian Application No. 2020119821/07(033629) dated Jan. 19, 2022, 16 pages (with English translation).

\* cited by examiner

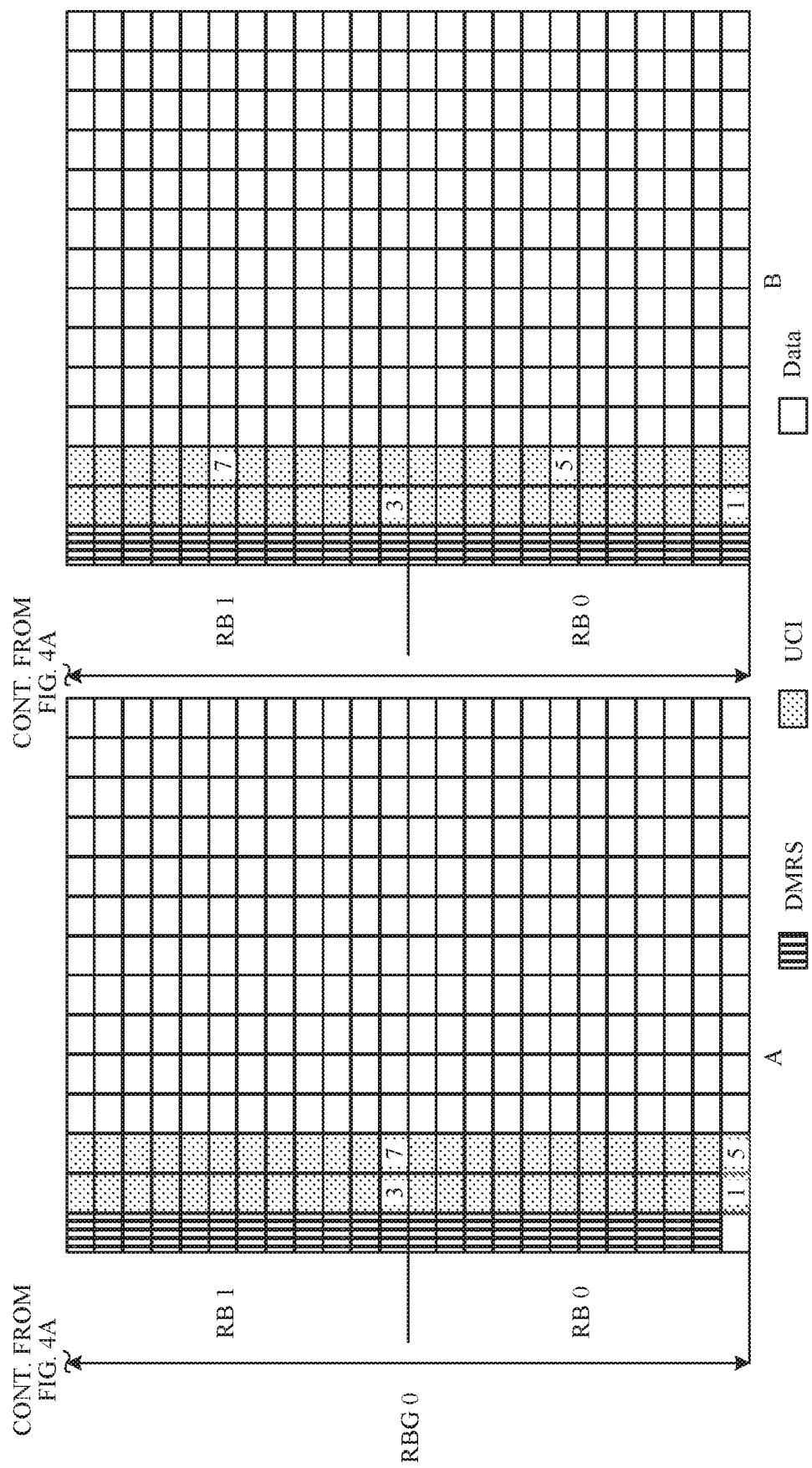

UPLINK CONTROL INFORMATION TRANSMISSION METHOD AND APPARATUS

CROSS-REFERENCE TO RELATED APPLICATIONS

This application is a continuation of International Application No, PCT/CN2018/107102, filed on Sep. 21, 2018, which claims priority to Chinese Patent Application No. 201711148190.1, filed on Nov. 17, 2017. The disclosures of the aforementioned applications are hereby incorporated by reference in their entireties.

TECHNICAL FIELD

This application relates to the field of wireless communication technologies, and in particular, to an uplink control information transmission method and apparatus.

BACKGROUND

Uplink control information (UCI) in long term evolution (LIE) includes a hybrid automatic repeat request-acknowledgement (HARQ-ACK), a scheduling request (SR), and channel state information (CSI) (a channel quality indication (CQI), a precoding matrix indication (PMI), and a rank indication (RI)). The HARQ-ACK is used to feed back a receiving status of a downlink data channel, that is, a physical downlink shared channel (PDSCH). When performing correct receiving, user equipment (UE) sends an ACK. When performing incorrect receiving, the UE sends a negative acknowledgement (HACK). A base station determines a next scheduling policy, for example, retransmission or new transmission, based on feedback information of the UE for the PDSCH channel. The SR is scheduling request information sent by the UE to the base station, and indicates that the UE needs to send uplink data. The CSI is channel state information fed back by the UE to the base station after the UE measures a channel state, and the information further includes the CQI/PMI/RI. The CQI is channel quality indication information, and is used to directly feed back channel quality. The base station may further determine, based on the CQI, a modulation and coding scheme (MCS) for sending data. When a value of the fedback CQI is large, a relatively high modulation and coding scheme and a relatively high code rate may be used, so that more information is carried on a limited resource, thereby improving a data transmission rate. When a value of the fedback CQI is relatively small, a relatively low modulation and coding scheme and a relatively low code rate may be used, so that more time-frequency resources are used to transmit data, thereby improving data transmission reliability. In addition, the UE measures CQIs of different frequency domain resources, so that the based station can schedule data on a frequency domain resource with good channel quality, to obtain a frequency domain scheduling gain. The PMI is a precoding matrix identifier that is for sending data and that is fed back by the UE to the base station based on measured channel quality. The base station may determine a corresponding precoding matrix based on fedback PMI information. The RI is rank indication information, and is used to feed back, to the base station, a quantity of layers into which the channel can be separated. A larger quantity of layers indicates a larger amount of data that can be transmitted simultaneously. In addition, there is some other information, such as a channel state information reference signal resource indicator (CRI), used to feed back, to the base station, a measurement resource whose measured channel quality is the best in a plurality of measured measurement resources.

Control information may be transmitted by using two channels: a physical uplink control channel (PUCCH) and a physical uplink shared channel (PUCCH). In the LTE release 8, UE is not supported in simultaneously sending control information by using a PUCCH and sending data information by using a PUCCH. When UCI and data are transmitted simultaneously, multiplexing needs to be performed for the UCI and the data. This helps to maintain an uplink single-carrier characteristic, thereby improving uplink coverage of an edge user. In the LTE release 10, a high-layer parameter simultaneous PUCCH-PUCCH that supports simultaneous transmission of UCI and data is introduced. When simultaneous transmission of UCI and data is configured, one part of the UCI is supported in being transmitted on a PUCCH, and the other part of the UCI is supported in being transmitted on a PUSCH. When simultaneous transmission is not configured, if the UCI and the data are transmitted simultaneously, the UCI needs to be carried on the PUSCH through multiplexing.

Specifically, when the UCI is carried on the PUSCH through multiplexing, different information is processed in different manners. A processing manner in LTE is as follows: First, in terms of data transmission, UE generates a transport block (TB) at a medium access control (MAC) layer, and adds cyclic redundancy check (CRC) bits to the transport block. Then, the TB is segmented into code blocks, and CRC bits are added to each code block. Then, each code block to which the CRC bits are added is entered into an encoder for coding. After the coding, rate matching needs to be performed on coded data based on a quantity of actual time-frequency resources. After the rate matching, code blocks are cascaded to form a string of bit stream of data. Second, in terms of UCI transmission, after a CQI is coded, multiplexing needs to be performed for a coded CQI and the data. After an ACK and an RI are coded, a coded ACK and a coded RI are entered into an interleaver together with the CQI/data. The ACK is entered into the interleaver in a data puncturing manner, and the ACK is at a location next to a pilot of the PUSCH. The RI is at a location next to the ACK, and a rate matching method is used for the RI. Such placing is made in consideration that the ACK can have relatively good channel estimation performance and the RI has a specific effect on receiving the CQI/PMI correctly. In a process in which the UCI is carried on the PUSCH for transmission, a specific resource is portioned out of a time-frequency resource originally scheduled for the PUSCH, to carry the control information. Currently, in LTE, a resource for transmitting UCI is determined based on a quantity of information bits of the UCI and a quantity of information bits of data. However, in NR, a quantity of information bits of UCI increases a lot. Therefore, it is a key problem to implement resource allocation to balance transmission performance of UCI and data.

SUMMARY

This application provides an uplink control information transmission method and apparatus, to allocate sufficient resources to data and UCI during initial data transmission, thereby improving system performance.

According to a first aspect, this application provides an uplink control information transmission method, and the method includes:

determining, by a terminal device based on first information, a quantity of resources for sending UCI, where the first information includes any one of the following information combinations: a combination of scheduling information, a ratio of a quantity of bits of the UCI to a sum of the quantity of bits of the UCI and a quantity of bits of data, a first preset parameter, a parameter β, and a quantity of available resources of a PUSCH; a combination of scheduling information, a first preset parameter, a parameter β, a quantity of available resources of a PUSCH, and a code rate of scheduled data; or a combination of scheduling information, a ratio of a quantity of bits of the UCI to a quantity of bits of data, a first preset parameter, a parameter β, a quantity of available resources of a PUSCH, and a parameter α; and sending, by the terminal device, the UCI to a network device based on the determined quantity of resources for sending the UCI.

The terminal device sends the UCI to the network device based on the determined quantity of resources for sending the UCI. Because the terminal device uses the ratio of the quantity of bits of the UCI to the quantity of bits of the data as a proportion baseline for resource division when determining the quantity of resources for sending the UCI, a case in which all resources are allocated to the UCI during initial transmission and the data cannot be transmitted can be avoided.

In a possible design, the first preset parameter is a product of a first preset value and a quantity of frequency domain resource elements REs scheduled for the PUSCH and/or a product of a second preset value and a quantity of symbols of the PUSCH.

In a possible design, the first preset value is a bandwidth and/or a quantity of symbols.

In a possible design, the terminal device determines, according to Formula (1), Formula (2), Formula (3), Formula (4), or Formula (5), the quantity of resources for sending the UCI, where Formula (1) is:

$$Q' = \min\left(\left\lceil \frac{O \cdot A \cdot \beta_{offset}^{PUSCH}}{B+O} \right\rceil, C\right), \quad (1)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is an offset of the UCI relative to a reference code rate;

Formula (2) is:

$$Q' = \min\left(\left\lceil \frac{O \cdot A}{B+\beta_{offset}^{PUSCH}O} \right\rceil, C\right), \quad (2)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset;

Formula (3) is:

$$Q' = \min\left(\left\lceil \frac{\beta_{offset}^{PUSCH} O \cdot A}{B+\beta_{offset}^{PUSCH}O} \right\rceil, C\right), \quad (3)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset;

Formula (4) is:

$$Q'=\min(\lceil O \cdot \beta_{offset}^{PUSCH} \cdot R \rceil, C) \quad (4),$$ where Q' is the quantity of resources for sending the UCI, O is the quantity of bits of the UCI, R is the code rate of the data, C is a maximum quantity of resources for transmitting the UCI in a quantity of scheduled available resources of the data during transmission, and $\beta_{offset}^{PUSCH}$ is a preset offset; and Formula (5) is:

$$Q' = \min\left(\left\lceil \frac{O \cdot A \cdot \beta_{offset}^{PUSCH}}{B} \right\rceil, \alpha C\right), \quad (5)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{offset}^{PUSCH}$ is an offset of the UCI relative to a reference code rate, and α is a parameter.

The terminal device sends the UCI to the network device based on the quantity of resources that is for sending the UCI and that is determined according to the foregoing formula. Because the terminal device uses the ratio of the quantity of bits of the UCI to the quantity of bits of the data as a proportion baseline for resource division when determining the quantity of resources for sending the UCI, a case in which all resources are allocated to the UCI during initial transmission and the data cannot be transmitted can be avoided.

In a possible design, a value of C is associated with a mapping manner of the UCI; and the mapping manner of the UCI includes that a quantity of symbols to which the UCI is mapped on a time domain resource is less than or equal to a third preset value and a quantity of symbols to which the UCI is mapped on a frequency domain resource is related to a UCI type, or that a quantity of symbols to which the UCI is mapped on a frequency domain resource is less than or equal to a fourth preset value and a quantity of symbols to which the UCI is mapped on a time domain resource is related to a UCI type.

The terminal device may determine the value in the foregoing formulas based on the mapping manner of the UCI.

In a possible design, the third preset value is one or more of the following values: a preset quantity of symbols near a demodulation reference signal (DMS), a value related to the quantity of symbols of the PUSCH, a value related to whether the PUSCH supports frequency hopping, and a value related to whether an additional DMRS is supported.

In a possible design, the fourth preset value is one or more of the following values: a preset quantity of REs, a value related to the quantity of symbols of the PUSCH, a value related to a bandwidth of the PUSCH, and a value related to a phase tracking reference signal (PTRS) of the PUSCH.

In a possible design, the terminal device determines, according to Formula (6), Formula (7), Formula (8), or Formula (9), the quantity of resources for sending the UCI, where Formula (6) is:

$$Q' = \left\lceil \frac{O \cdot A \cdot \beta_{offset}^{PUSCH}}{B + O} \right\rceil, \quad (6)$$

where

Q' is the quantity of resources for sending the UCI, O is the quantity of bits of the UCI, B is the quantity of bits of the data, A is a quantity of available resources of the data during initial transmission, and $\beta_{offset}^{PUSCH}$ is an offset of the UCI relative to a reference code rate;

Formula (7) is:

$$Q' = \left\lceil \frac{O \cdot A}{B + \beta_{offset}^{PUSCH} O} \right\rceil, \quad (7)$$

where

Q' is the quantity of resources for sending the UCI, O is the quantity of bits of the UCI, B is the quantity of bits of the data, A is a quantity of available resources of the data during initial transmission, and $\beta_{offset}^{PUSCH}$ is a preset offset;

Formula (8) is:

$$Q' = \left\lceil \frac{\beta_{offset}^{PUSCH} O \cdot A}{B + \beta_{offset}^{PUSCH} O} \right\rceil, \quad (8)$$

where

Q' is the quantity of resources for sending the UCI, O is the quantity of bits of the UCI, B is the quantity of bits of the data, A is a quantity of available resources of the data during initial transmission, and $\beta_{offset}^{PUSCH}$ is a preset offset; and Formula (9) is:

$$Q' = \lceil O \cdot \beta_{offset}^{PUSCH} \cdot R \rceil \quad (9), \text{ where}$$

Q' is the quantity of resources for sending the UCI, O is the quantity of bits of the UCI, R is the code rate of the data, and $\beta_{offset}^{PUSCH}$ is a preset offset.

According to a second aspect, this application provides an uplink control information transmission method, including:

sending, by a network device, first indication information to a terminal device, where the first indication information includes one or more of scheduling information, a parameter β, and a parameter α, the first indication information is used by the terminal to determine first information, and the first information includes any one of the following information combinations: a combination of the scheduling information, a ratio of a quantity of bits of UCI to a sum of the quantity of bits of the UCI and a quantity of bits of data, a first preset parameter, the parameter β, and a quantity of available resources of a PUSCH; a combination of the scheduling information, a first preset parameter, the parameter β, a quantity of available resources of a PUSCH, and a code rate of scheduled data; or a combination of the scheduling information, a ratio of a quantity of bits of UCI to a quantity of bits of data, a first preset parameter, the parameter β, a quantity of available resources of a PUSCH, and the parameter α.

According to a third aspect, this application provides an uplink control information transmission apparatus, including a processing unit and a communications unit, where the processing unit is configured to determine, based on first information, a quantity of resources for sending UCI, where the first information includes any one of the following information combinations: a combination of scheduling information, a ratio of a quantity of bits of the UCI to a sum of the quantity of bits of the UCI and a quantity of bits of data, a first preset parameter, a parameter β, and a quantity of available resources of a PUSCH; a combination of scheduling information; a first preset parameter, a parameter β, a quantity of available resources of a PUSCH, and a code rate of scheduled data; or a combination of scheduling information, a ratio of a quantity of bits of the UCI to a quantity of bits of data, a first preset parameter, a parameter β, a quantity of available resources of a PUSCH, and a parameter α; and the communications unit is configured to send the UCI to a network device based on the quantity of resources that is for sending the UCI and that is determined by the processing unit.

In a possible design, the first preset parameter is a product of a first preset value and a quantity of frequency domain resource elements REs scheduled for the PUSCH and/or a product of a second preset value and a quantity of symbols of the PUSCH.

In a possible design, the first preset value is a bandwidth and/or a quantity of symbols.

In a possible design, the processing unit is specifically configured to:

determine, according to Formula (1), Formula (2), Formula (3), Formula (4), or Formula (5), the quantity of resources for sending the UCI, where Formula (1) is:

$$Q' = \min\left(\left\lceil \frac{O \cdot A \cdot \beta_{offset}^{PUSCH}}{B + O} \right\rceil, C\right), \quad (1)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is an offset of the UCI relative to a reference code rate;

Formula (2) is:

$$Q' = \min\left(\left\lceil \frac{O \cdot A}{B + \beta_{offset}^{PUSCH} O} \right\rceil, C\right), \quad (2)$$

where

Q' is the quantity of resources for sending the UCI, O is the quantity of bits of the UCI, B is the quantity of bits of the data, A is a quantity of available resources of the data during initial transmission. C is a maximum quantity of resources for transmitting the UCI in a quantity of scheduled available resources of the data during transmission, and $\beta_{offset}^{PUSCH}$ is a preset offset;

Formula (3) is:

$$Q' = \min\left(\left\lceil \frac{\beta_{offset}^{PUSCH} O \cdot A}{B + \beta_{offset}^{PUSCH} O} \right\rceil, C\right), \quad (3)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset;

Formula (4) is:

$$Q'=\min(\lceil O \cdot \beta_{offset}^{PUSCH} \cdot R \rceil, C) \quad (4),$$ where Q' is the quantity of resources for sending the UCI, O is the quantity of bits of the UCI, R is the code rate of the data, C is a maximum quantity of resources for transmitting the UCI in a quantity of scheduled available resources of the data during transmission, and $\beta_{offset}^{PUSCH}$ is a preset offset; and Formula (5) is:

$$Q' = \min\left(\left\lceil \frac{O \cdot A \cdot \beta_{offset}^{PUSCH}}{B} \right\rceil, \alpha C\right), \quad (5)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{offset}^{PUSCH}$ is an offset of the UCI relative to a reference code rate, and $\alpha$ is a parameter.

In a possible design, a value of C is associated with a mapping manner of the UCI; and the mapping manner of the UCI includes that a quantity of symbols to which the UCI is mapped on a time domain resource is less than or equal to a third preset value and a quantity of symbols to which the UCI is mapped on a frequency domain resource is related to a UCI type, or that a quantity of symbols to which the UCI is mapped on a frequency domain resource is less than or equal to a fourth preset value and a quantity of symbols to which the UCI is mapped on a time domain resource is related to a UCI type.

In a possible design, the third preset value is one or more of the following values:

a preset quantity of symbols near a DMRS, a value related to the quantity of symbols of the PUSCH, a value related to whether the PUSCH supports frequency hopping, and a value related to whether an additional DMRS is supported.

In a possible design, the fourth preset value is one or more of the following values:

a preset quantity of REs, a value related to the quantity of symbols of the PUSCH, a value related to a bandwidth of the PUSCH, and a value related to a VMS of the PUSCH.

According to a fourth aspect, an embodiment of this application provides an uplink control information transmission apparatus, and the apparatus may be a terminal device, or may be a chip in a terminal device. The apparatus has a function for implementing each embodiment in the first aspect. The function may be implemented by hardware, or may be implemented by hardware by executing corresponding software. The hardware or software includes one or more modules corresponding to the function.

In a possible design, when the apparatus is the terminal device, the terminal device includes a processing unit and a communications unit. The processing unit may be, for example, a processor; the communications unit may be, for example, a transceiver; and the transceiver includes a radio frequency circuit. Optionally, the terminal device further includes a storage unit, and the storage unit may be, for example, a memory. When the terminal device includes the storage unit, the storage unit stores a computer executable instruction. The processing unit is connected to the storage unit, and the processing unit executes the computer executable instruction stored in the storage unit, so that the terminal device performs the uplink control information transmission method in any one of the first aspect or the possible designs of the first aspect.

In another possible design, when the apparatus is the chip in the terminal device, the chip includes a processing unit and a communications unit. The processing unit may be, for example, a processor; and the communications unit may be, for example, an input/output interface, a pin, or a circuit. The processing unit can execute a computer executable instruction stored in a storage unit, to perform the uplink control information transmission method in any one of the first aspect or the possible designs of the first aspect. Optionally, the storage unit is a storage unit in the chip, for example, a register or a cache. Alternatively, the storage unit may be a storage unit that is in the terminal device and that is located outside the chip, for example, a read-only memory, another type of static storage device that can store static information and an instruction, or a random access memory.

According to a fifth aspect, this application further provides a communications apparatus, including a processing element and a storage element. The storage element is configured to store a program, and when the program is invoked by the processing element, the communications apparatus is configured to perform the methods in the foregoing aspects.

According to a sixth aspect, this application further provides a computer readable storage medium, and the computer readable storage medium stores an instruction. When the instruction runs on a computer, the computer is enabled to perform the methods in the foregoing aspects.

According to a seventh aspect, this application further provides a computer program product that includes an instruction. When the computer program product runs on a computer, the computer is enabled to perform the methods in the foregoing aspects.

BRIEF DESCRIPTION OF DRAWINGS

FIG. 4A and FIG. 4B are a schematic diagram of resource mapping according to this application;

DESCRIPTION OF EMBODIMENTS

Figure 1:
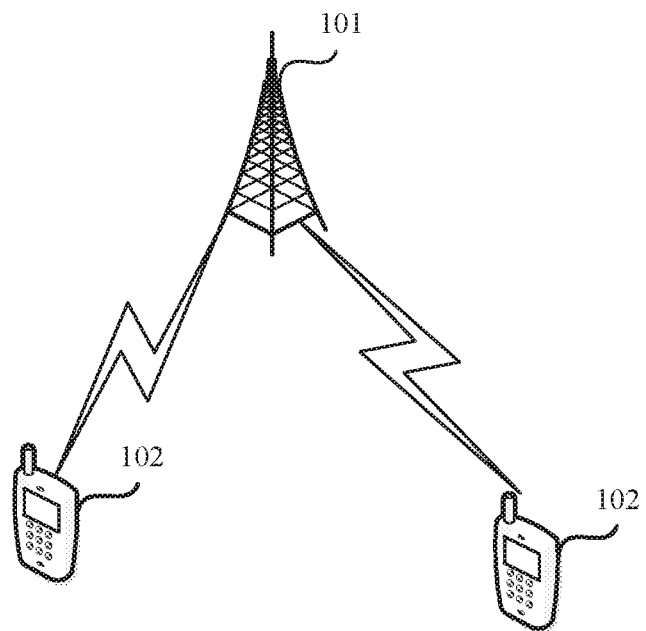
FIG. 1 is a schematic diagram of a system architecture according to this application.

FIG. 1 is a schematic diagram of a system architecture to which this application is applicable. As shown in FIG. 1, the system architecture includes a network device 101 and one or more terminal devices 102. The network device 101 may transmit downlink data to the terminal device 102 through a network, and the terminal device 102 may transmit uplink data to the network device 101 through the network.

In this application, the network device may be a base station (BS) device. The base station device may also be referred to as a base station, and is an apparatus that is deployed in a radio access network to provide a wireless communications function. For example, a device that provides a base station function in a 2G network includes a base transceiver station (BTS) and a base station controller (BSC); a device that provides a base station function in a 3G network includes a NodeB and a radio network controller (RNC); a device that provides a base station function in a 4G network includes an evolved NodeB (eNB); and a device that provides a base station function in a 5G network includes a new radio NodeB (gNB), a centralized unit (CU), a distributed unit, and a new radio controller.

The terminal device is a device that has a wireless transmission/reception function. The terminal device may be deployed on land, and include an indoor device, an outdoor device, a hand-held device, or a vehicle-mounted device; or may be deployed on the water (for example, on a ship); or may be deployed in the air (for example, on a plane, a balloon, or a satellite). The terminal device may be a mobile phone, a tablet (Pad), a computer having a wireless transmission/reception function, a virtual reality (VR) terminal device, an augmented reality (AR) terminal device, a wireless terminal device in industrial control, a wireless terminal device in self-driving, a wireless terminal device in remote medical, a wireless terminal device in a smart grid, a wireless terminal device in transportation safety; a wireless terminal device in a smart city, a wireless terminal device in a smart home, or the like.

In this application, the system architecture shown in FIG. 1 is mainly used as an example for description, but this application sets no limited thereto. For example, this application may be further applied to a system architecture in which a macro base station communicates with a micro base station. This is not specifically limited.

A communications system to which the foregoing system architecture is applicable includes but is not limited to: time division duplex-long term evolution (TDD LIFE), frequency division duplex-long term evolution (FDD LTE), long term evolution-advanced (LTE-A), and various future evolved wireless communications systems (for example, a new radio access technology (NR) system).

Currently, in LTE, a channel quality indication (CQI)/precoding matrix indication (PMI) in uplink control information (UCI) has a limited quantity of bits, and each carrier has a maximum of 64 bits. Considering that CQIs/PMIs of a maximum of 16 cells need to be fed back, a maximum quantity of bits is 64×16=1024. This is smaller than a quantity of bits of data, and therefore has little impact on performance of the UCI and the data.

However, in NR, a quantity of information bits of UCI becomes large. For example, an amount of information of a channel state information part 2 (channel state information part 2, CSI part 2) of a single cell reaches up to thousands of bits. In this case, the quantity of information bits of the UCI may be very likely to exceed a quantity of information bits of data. All resource elements (resource element, RE) in a PUSCH except resource elements used to transmit a CSI part 1 are to be used to transmit the CSI part 2, and therefore the data cannot be transmitted. Consequently, the data actually cannot be sent at a base station side.

Figure 2:
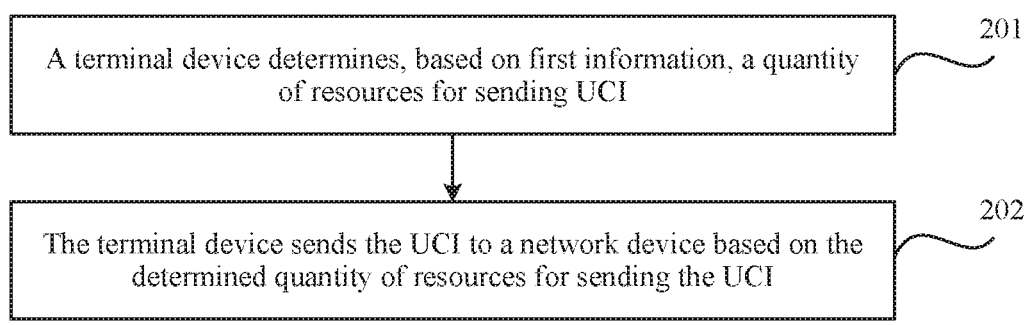
FIG. 2 is a schematic flowchart of an uplink control information transmission method according to this application.

To resolve this technical problem, FIG. 2 shows an example of an uplink control information transmission procedure according to this application. The procedure may be performed by a terminal device.

As shown in FIG. 2, the procedure specifically includes the following steps.

Step 201: The terminal device determines, based on first information, a quantity of resources for sending UCI.

Step 202: The terminal device sends the UCI to a network device based on the determined quantity of resources for sending the UCI.

In this application, the UCI includes but is not limited to the following information: a hybrid automatic repeat request-acknowledgement (HARQ-ACK), a scheduling request (SR), a CSI part 1, a CSI part 2, and the like. CSI information may further include information such as a CQI, a PMI, and a rank indication (RI). Before step 201, the network device sends first indication information to the terminal device. The first indication information includes scheduling information, a parameter β, and a parameter α. The terminal device may determine the first information based on the first indication information. The first information may include any one of the following information combinations: a combination of the scheduling information, a ratio of a quantity of bits of the UCI to a sum of the quantity of bits of the UCI and a quantity of bits of data, a first preset parameter, the parameter β, and a quantity of available resources of a PUSCH; a combination of the scheduling information, a first preset parameter, the parameter β, a quantity of available resources of a PUSCH, and a code rate of scheduled data; a combination of the scheduling information, a ratio of a quantity of bits of the UCI to a quantity of bits of data, a first preset parameter, the parameter β, a quantity of available resources of a PUSCH, and the parameter n; or the like. These information combinations are merely examples, and this application sets no limitation thereto. In this application, the quantity of resources may be a quantity of REs. This is merely an example, and no limitation is set thereto. It should be noted that the quantity of bits of the UCI, the quantity of bits of the data, and the quantity of available resources of the PUSCH are agreed on by both the network device and the terminal device, and may be determined by the terminal device without being sent by the network device.

The first preset parameter may be a product of a first preset value and a quantity of frequency domain resource elements REs scheduled for the PUSCH and/or a product of a second preset value and a quantity of symbols of the PUSCH. In other words, the first preset parameter may be the product of the first preset value and the quantity of frequency domain resource elements REs scheduled for the PUSCH, or the first preset parameter may be the product of the second preset value and the quantity of symbols of the PUSCH, or the first preset value may be one of the product of the first preset value and the quantity of frequency domain resource elements REs scheduled for the PUSCH and the product of the second preset value and the quantity of symbols of the PUSCH. Optionally, the first preset value may be a bandwidth and/or a quantity of symbols. In other words, the first preset value may be the bandwidth, or the first preset value may be the quantity of symbols, or the first preset value may be one of the bandwidth and the quantity of symbols.

In this application, different from LTE, in NR, when UCI information is HARQ-ACK information, the HARQ-ACK information is transmitted in a puncturing manner when being less than 2 bits, and is transmitted in a rate matching manner when being greater than 2 bits; or when UCI information is CSI information, the CSI information is further divided into a CSI part 1 and a CSI part 2. A priority of the CSI part 1 is higher, and a priority of the CSI part 2 is lower. A value of the CSI part 2 may be determined based on a value of the CSI part 1. A quantity of bits of the CSI part 2 is much larger than that in LTE. Both the CSI part 1 and the CSI part 2 are transmitted in a rate matching manner. To support proper allocation for the UCI and data during initial transmission in NR, resources may be properly allocated based on an actual ratio of a quantity of bits of the UCI to a quantity of bits of the data.

When the first information is the combination of the scheduling information, the ratio of the quantity of bits of the UCI to the sum of the quantity of bits of the UCI and the quantity of bits of the data, the first preset parameter, the parameter β, and the quantity of available resources of the physical uplink shared channel PUSCH, in a possible implementation, the quantity of resources for sending the UCI is determined according to Formula (1).

Formula (1) may be:

$$Q' = \min\left(\left\lceil \frac{O \cdot A \cdot \beta_{offset}^{PUSCH}}{B + O} \right\rceil, C\right), \quad (1)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is an offset of the UCI relative to a reference code rate. It should be noted that the reference code rate may be a ratio of the quantity of available resources of the data during initial transmission to the sum of the quantity of bits of the UCI and the quantity of bits of the data. This is merely an example in this application, and no specific limitation is set thereto.

Optionally, O may represent a quantity of bits that is obtained after a CRC check bit is added to the UCI. In this case, B represents a quantity of bits that is obtained after CRC bits are added to the data. In this case, B may be a quantity of bits that is obtained after a transport block (TB) is segmented into code blocks and then cyclic redundancy check (CRC) bits are added to each code book. This step is usually performed before each code book is entered into an encoder. A may represent a quantity of available REs of the data during initial transmission when the UCI is not considered in NR. Alternatively, A may be represented as a quantity of available REs that are used to transmit the data after the UCI is actually considered. Optionally, O may represent a quantity of bits remaining after some information is discarded according to a specific rule when the quantity of bits of the UCI is excessively large.

C may represent a maximum quantity of REs that can be used to transmit current UCI in scheduled available REs of the data during current transmission. If the current UCI is the CSI part 2, and a data rate matching manner is used for the HARQ-ACK, a possible implementation is a quantity of scheduled REs of the data except a quantity of REs of the CSI part 1 and the HARQ-ACK. If the current UCI is the CSI part 2, and a data puncturing manner is used for the HARQ-ACK, a possible implementation is a quantity of scheduled REs of the data except a quantity of REs of the CSI part 1.

It can be learned from Formula (1) that, the quantity of bits of the UCI is placed at a denominator, so that a calculation result on the left can be controlled to be less than a value of a scheduled resource A by properly configuring a value of the parameter β. Therefore, data resources are not all occupied by the UCI during initial transmission. It can be learned that, during resource allocation, bit information of the UCI is actually more important than that of the data. Therefore, if resource allocation is performed completely based on the ratio between the quantities of bits, a code rate of the UCI is actually higher. In this case, the code rate may be further adjusted by properly configuring the parameter β.

The ratio of the quantity of bits of the UCI to the quantity of bits of the data is used as a proportion baseline for resource division, and the ratio is further adjusted by using the parameter β, so that a case in which all resources are allocated to the UCI during initial transmission and the data cannot be transmitted can be avoided.

In another possible implementation, the quantity of resources for sending the UCI is determined according to Formula (2).

$$Q' = \min\left(\left\lceil \frac{O \cdot A}{B + \beta_{offset}^{PUSCH} O} \right\rceil, C\right), \quad (2)$$

where

Q' is the quantity of resources for sending the UCI, O is the quantity of bits of the UCI, B is the quantity of bits of the data, A is a quantity of available resources of the data during initial transmission. C is a maximum quantity of resources for transmitting the UCI in a quantity of scheduled available resources of the data during transmission, and $\beta_{offset}^{PUSCH}$ is a preset offset. The preset offset may be set based on experience.

Optionally, O may represent a quantity of bits that is obtained after a CRC check bit is added to the UCI. In this case, B represents a quantity of bits that is obtained after CRC bits are added to the data. In this case, B may be a quantity of bits that is obtained after a TB is segmented into code blocks and then CRC bits are added to each code book. This step is usually performed before each code book is entered into an encoder. A may represent a quantity of available REs of the data during initial transmission when the UCI is not considered in NR. Alternatively, A may be represented as a quantity of available REs that are used to transmit the data after the UCI is actually considered. Optionally, O may represent a quantity of bits remaining after some information is discarded according to a specific rule when the quantity of bits of the UCI is excessively large.

C may represent a maximum quantity of REs that can be used to transmit current UCI in scheduled available REs of the data during current transmission. If the current UCI is the CSI part 2, and a data rate matching manner is used for the HARQ-ACK, a possible implementation is a quantity of scheduled REs of the data except a quantity of REs of the CSI part 1 and the HARQ-ACK. If the current UCI is the CSI part 2, and a data puncturing manner is used for the HARQ-ACK, a possible implementation is a quantity of scheduled REs of the data except a quantity of REs of the CSI part 1.

According to Formula (2), resource allocation is implemented by adjusting the ratio of the quantity of bits of the data to the quantity of bits of the UCI. The ratio of the quantity of bits of the UCI to the quantity of bits of the data is used as a proportion baseline for resource division, and the ratio is adjusted by using the parameter β, so that a case in which all resources are allocated to the UCI during initial transmission and the data cannot be transmitted can be avoided.

This application further provides a possible implementation in which the quantity of resources for sending the UCI is determined according to Formula (3).

Formula (3) may be:

$$Q' = \min\left(\left\lceil \frac{\beta_{offset}^{PUSCH} O \cdot A}{B + \beta_{offset}^{PUSCH} O} \right\rceil, C\right) \quad (3)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is an offset of the UCI relative to a reference code rate.

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset. The preset offset may be set based on experience.

Optionally, O may represent a quantity of bits that is obtained after a CRC check bit is added to the UCI. In this case, B represents a quantity of bits that is obtained after CRC bits are added to the data. In this case, B may be a quantity of bits that is obtained after a TB is segmented into code blocks and then CRC bits are added to each code book. This step is usually performed before each code book is entered into an encoder. A may represent a quantity of available REs of the data during initial transmission when the UCI is not considered in NR. Alternatively, A may be represented as a quantity of available REs that are used to transmit the data after the UCI is actually considered. Optionally, O may represent a quantity of bits remaining after some information is discarded according to a specific rule when the quantity of bits of the UCI is excessively large.

C may represent a maximum quantity of REs that can be used to transmit current UCI in scheduled available REs of the data during current transmission. If the current UCI is the CSI part 2, and a data rate matching manner is used for the HARQ-ACK, a possible implementation is a quantity of scheduled REs of the data except a quantity of REs of the CSI part 1 and the HARQ-ACK. If the current UCI is the CSI part 2, and a data puncturing manner is used for the HARQ-ACK, a possible implementation is a quantity of scheduled REs of the data except a quantity of REs of the CSI part 1.

According to Formula (3), resource allocation is implemented by adjusting a weighted ratio of the quantity of bits of the data to the quantity of bits of the UCI. The ratio of the quantity of bits of the UCI to the quantity of bits of the data is used as a proportion baseline for resource division, and the ratio is adjusted by using the parameter β, so that a case in which all resources are allocated to the UCI during initial transmission and the data cannot be transmitted can be avoided.

When the first information is the combination of the scheduling information, the first preset parameter, the parameter β, the quantity of available resources of the PUSCH, and the code rate for scheduling the data, in a possible implementation, the terminal device determines, according to Formula (4), the quantity of resources for sending the UCI.

Formula (4) may be:

$$Q' = \min(\lceil O \cdot \beta_{offset}^{PUSCH} \cdot R \rceil, C) \quad (4),$$

where

Q' is the quantity of resources for sending the UCI, O is the quantity of bits of the UCI, R is the code rate of the data, C is a maximum quantity of resources for transmitting the UCI in a quantity of scheduled available resources of the data during transmission, and $\beta_{offset}^{PUSCH}$ is a preset offset. The preset offset may be set based on experience.

Optionally, O may represent a quantity of bits that is obtained after a CRC check bit is added to the UCI. C may represent a maximum quantity of REs that can be used to transmit current UCI in scheduled available REs of the data during current transmission. If the current UCI is the CSI part 2, and a data rate matching manner is used for the HARQ-ACK, a possible implementation is a quantity of scheduled REs of the data except a quantity of REs of the CSI part 1 and the HARQ-ACK. If the current UCI is the CSI part 2, and a data puncturing manner is used for the HARQ-ACK, a possible implementation is a quantity of scheduled REs of the data except a quantity of REs of the CSI part 1. Optionally, O may represent a quantity of bits remaining after some information is discarded according to a specific rule when the quantity of bits of the UCI is excessively large.

R in Formula (4) represents the code rate of the data, and the code rate of the data is a code rate corresponding to an MCS. The UE uniquely determines R based on an MCS indicated in data scheduling, and calculates a quantity of available REs of the corresponding UCI based on R. The code rate is a code rate used for actual data transmission, and the foregoing problem does not occur.

The terminal device uses R as a reference code rate according to Formula (4) and adjusts the code rate by using the parameter β, so that a case in which all resources are allocated to the UCI during initial transmission and the data cannot be transmitted can be avoided.

When the first information is the combination of the scheduling information, the ratio of the quantity of bits of the UCI to the quantity of bits of the data, the first preset parameter, the parameter β, the quantity of available resources of the PUSCH, and the parameter α, in a possible implementation, the terminal device determines, according to Formula (5), the quantity of resources for sending the UCI.

Formula (5) is:

$$Q' = \min\left(\left\lceil \frac{O \cdot A \cdot \beta_{offset}^{PUSCH}}{B} \right\rceil, \alpha C\right), \quad (5)$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{offset}^{PUSCH}$ is an offset of the UCI relative to a reference code rate, and α is a parameter. In this case, the reference code rate may be a ratio of the quantity of available resources of the data during initial transmission to the quantity of bits of the data. This is merely an example in this application, and no limitation is set thereto.

Optionally, O may represent a quantity of bits that is obtained after a CRC check bit is added to the UCI. In this case, B represents a quantity of bits that is obtained after CRC bits are added to the data. In this case, B may be a quantity of bits that is obtained after a TB is segmented into code blocks and then CRC bits are added to each code book. This step is usually performed before each code book is entered into an encoder. A may represent a quantity of available REs of the data during initial transmission when the UCI is not considered in NR. Alternatively, A may be represented as a quantity of available REs that are used to transmit the data after the UCI is actually considered. Optionally, O may represent a quantity of bits remaining after some information is discarded according to a specific rule when the quantity of bits of the UCI is excessively large.

C may represent a maximum quantity of REs that can be used to transmit current UCI in scheduled available REs of the data during current transmission. If the current UCI is the CSI part 2, and a data rate matching manner is used for the HARQ-ACK, a possible implementation is a quantity of scheduled REs of the data except a quantity of REs of the CSI part 1 and the HARQ-ACK. If the current UCI is the CSI part 2, and a data puncturing manner is used for the HARQ-ACK, a possible implementation is a quantity of scheduled REs of the data except a quantity of REs of the CSI part 1.

The parameter α is added to an item on the right in Formula (5) to limit a value of the UCI, so as to prevent the UCI from occupying all available REs. Optionally, the parameter α is usually less than 1. The parameter α may be configured by using signaling, for example, configured by using higher layer signaling, which may be RRC signaling; or may be carried by a MAC-CE.

The terminal device limits, by using the parameter α, an RE occupied by the UCI, so that a case in which all resources are allocated to the UCI during initial transmission and the data cannot be transmitted can be avoided.

It should be noted that a value of C in the foregoing Formulas (1) to (5) is strongly correlated with a mapping manner of the UCI, in other words, the value of C is associated with the mapping manner of the UCI. On a basis that both the ACK and the CSI can be distributed on REs of different RBs in frequency domain, possible mapping manners of the UCI may be the following several manners.

Manner 1: There is a limitation in time domain and there is an increase in frequency domain.

A quantity of symbols to which the UCI is mapped on a time domain resource is less than or equal to a third preset value and a quantity of symbols to which the UCI is mapped on a frequency domain resource is related to a UCI type. The third preset value is one or more of the following values: a preset quantity of symbols near a demodulation reference signal (DMRS), a value related to the quantity of symbols of the PUSCH, a value related to whether the PUSCH supports frequency hopping, a value related to whether an additional DMRS is supported, and the like.

Figure 3:
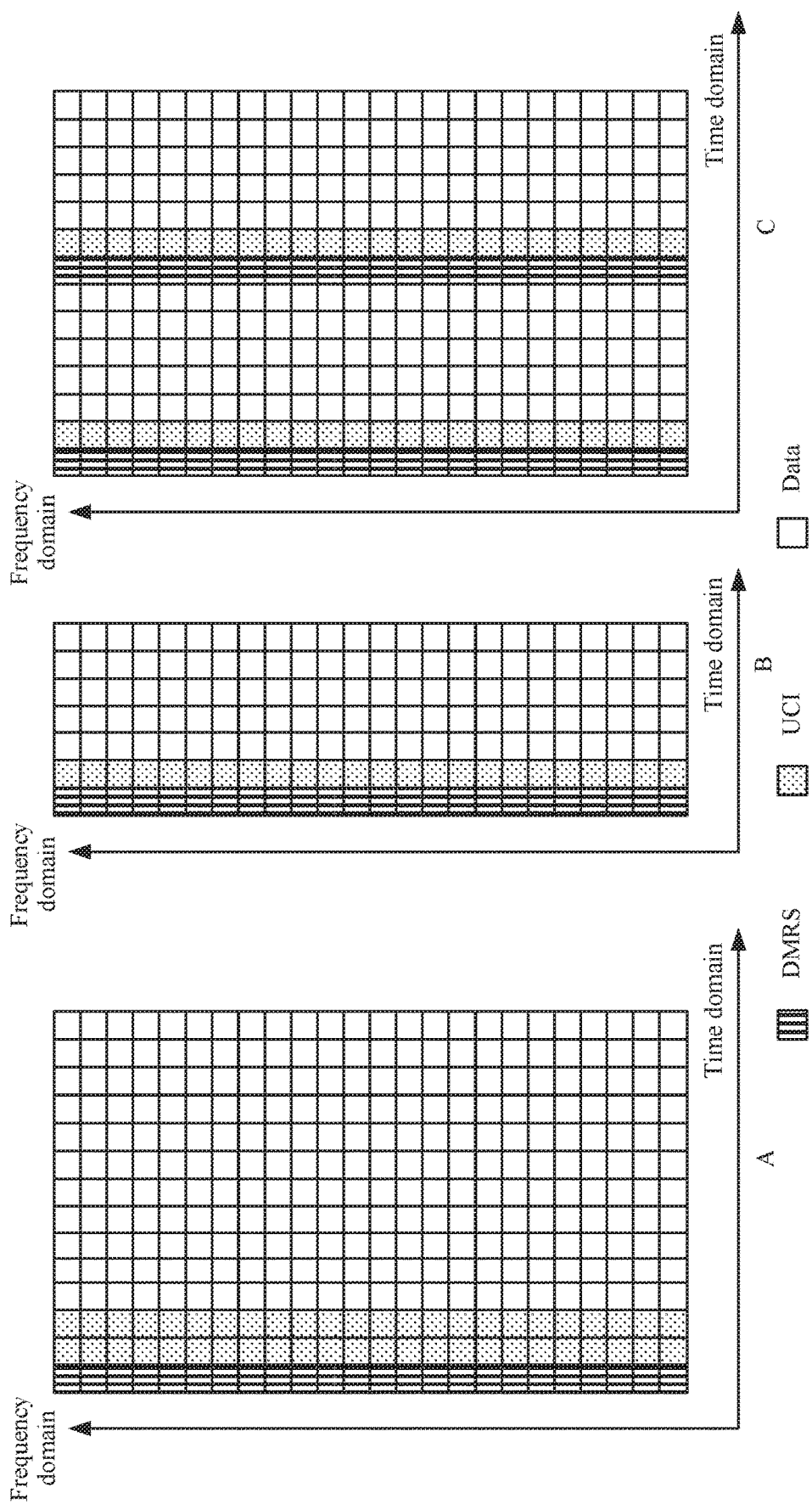
FIG. 3 is a schematic diagram of resource mapping according to this application.

For example, as shown in FIG. 3, the third preset value may be the preset quantity of symbols near the DMRS, and may be a fixed value that is set based on experience, for example, may indicate fixed N symbols near the DMRS, where N is greater than or equal to 1. As shown in A in FIG. 3, N is 2, and the third preset value is 2. In this case, the value of C is a product of the symbol quantity 2 and a bandwidth.

The third preset value is the value related to the quantity of symbols of the PUSCH and is associated with a time domain length indication of the PUSCH, and is specifically determined based on a time domain indication table of the PUSCH. As shown in B in FIG. 3, when the PUSCH is 7 symbols, the third preset value may indicate one symbol; and when the PUSCH is 14 symbols, the third preset value may indicate two symbols. For example, when the PUSCH is 7 symbols, the value of C may be a product of the symbol quantity 1 and a bandwidth.

The third preset value may be the value related to whether the PUSCH supports frequency hopping. As shown in C in FIG. 3, when frequency hopping is supported, the symbol is symmetrically distributed on a frequency hopping resource. For example, when the PUSCH does not support frequency hopping, the value indicates a symbol 1 or 2. When the PUSCH supports frequency hopping, the value indicates the symbol 1 and a symbol 8. For example, when the PUSCH does not support frequency hopping, the value of C may be a product of a symbol quantity 1 and a bandwidth.

Alternatively, the third preset value may be the value related to whether an additional DMRS is supported. When there is one DMRS, the quantity of the symbols is 1, and when there are two DMRSs, the quantity of the symbols is 2. For example, when there is one DMRS, the value of C may be a product of the symbol quantity 1 and a bandwidth.

It should be noted that in these several cases, the value of C in the foregoing Formulas (1) to (5) is a product of a quantity of symbols and a bandwidth scheduled for the PUSCH.

Optionally, the UCI is discretely mapped in frequency domain, and a unit of discrete distribution may be a resource block (RB), a resource block group (RBG), a precoding resource group (PRG), or a subband.

A possible mapping manner of the UCI in frequency domain is that the UCI is first mapped at a large granularity and then mapped at a small granularity. As shown in FIG. 4A, FIG. 4B, FIG. 5A, and FIG. 5B, the UCI is mapped in a number sequence and is first mapped within an RBG range, that is, the UCI is mapped in the following sequence: a first RE in an RB 0 of an RBG 0, a first RE in an RB 0 of an RBG 1, a first RE in an RB 1 of the RBG 0, and a first RE in an RB 1 of the RBG 1.

It should be noted that in this application, a location that is of the UCI and that is represented by a graph is a location of an available resource of the UCI, and a location marked with a number is a location of a resource occupied by the UCI information. All numbers in this application are merely examples, and no limitation is set thereto. The same description is provided for subsequent types.

It should be noted that the RB and the RBG herein are only examples of different granularities in frequency domain. Any mapping manner that meets a condition that the UCI is first mapped at a large granularity and then mapped at a small granularity shall fall within the protection scope of this application. Mapping to a first RE in an RB is only one manner, and the UCI may be alternatively mapped to any RE in an RB in a predefined manner.

Figure 4A:
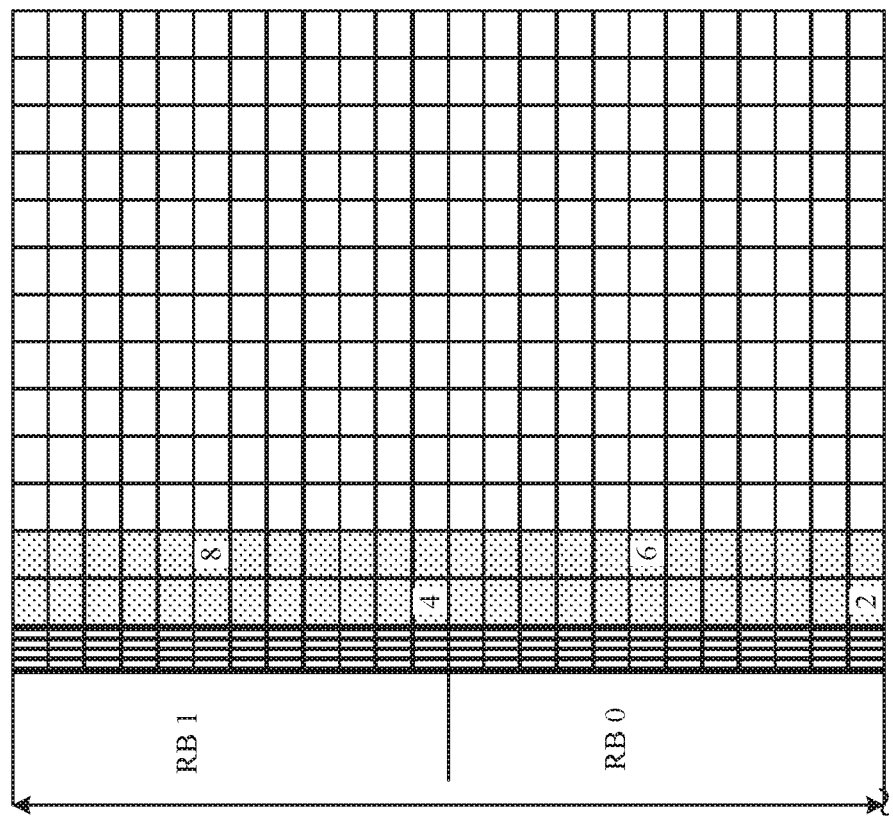
Figure 4A:
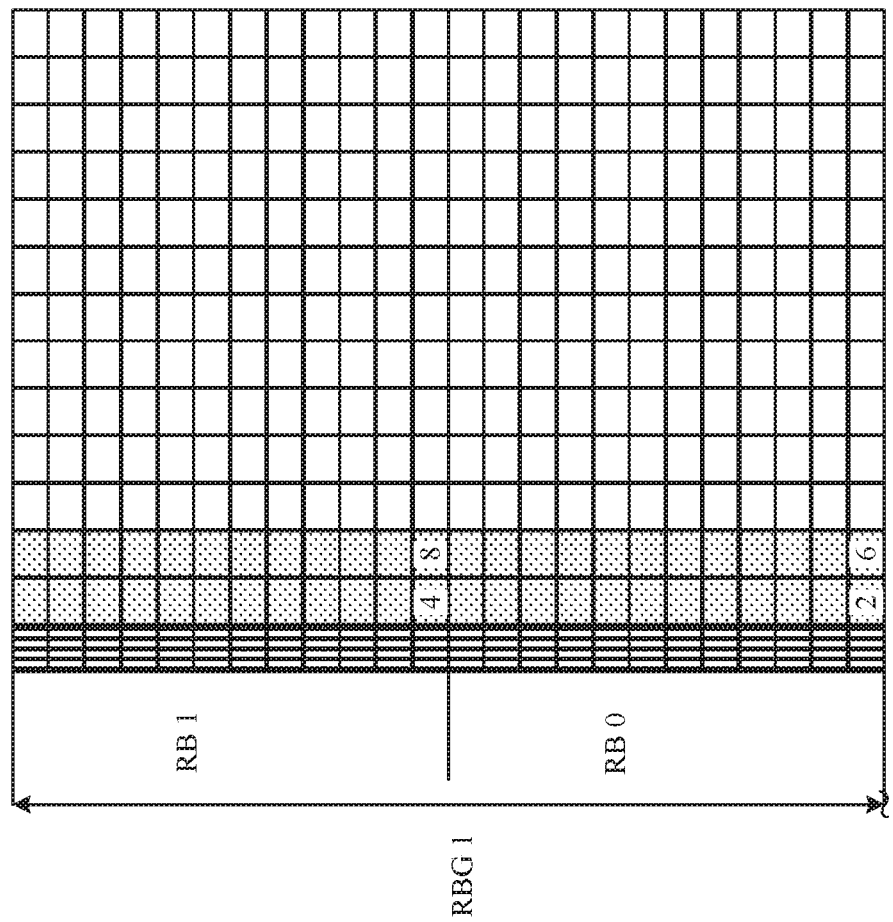
Figure 5A:
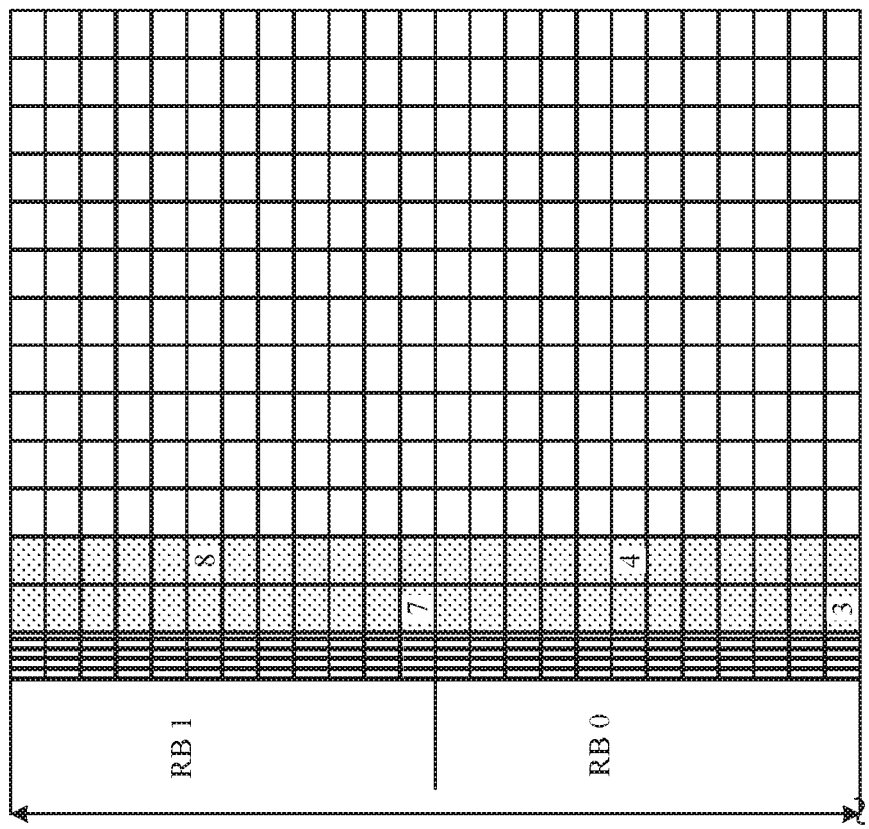
FIG. 5A and FIG. 5B are a schematic diagram of resource mapping according to this application.
Figure 5A:
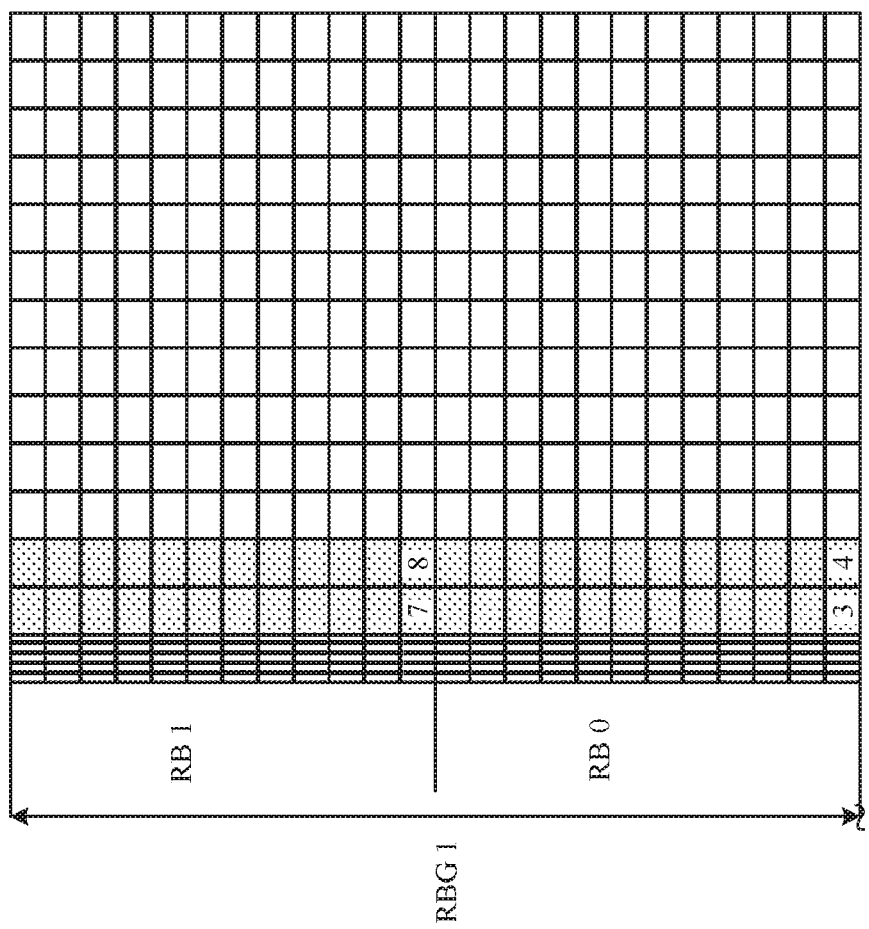
Figure 5B:
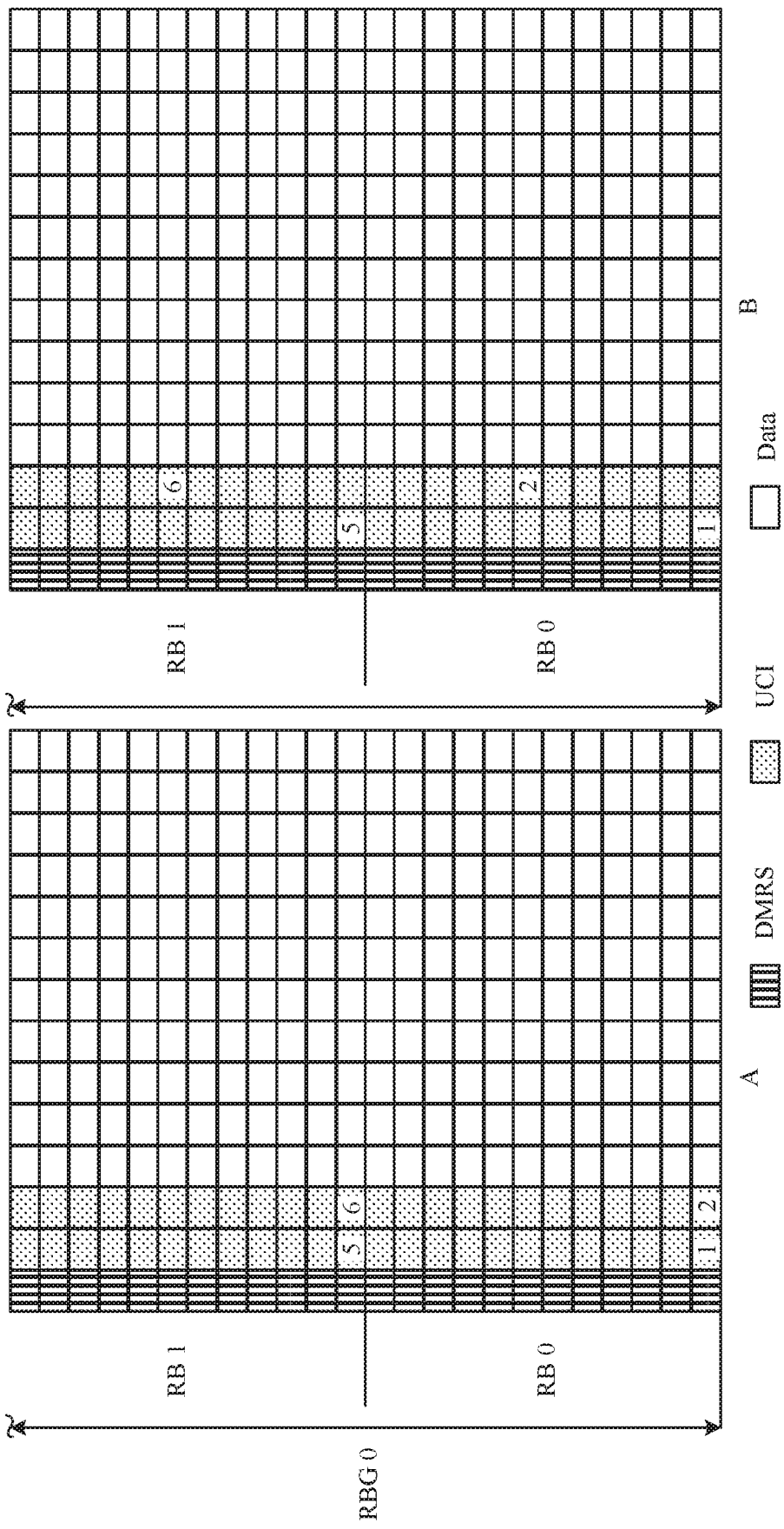

A and B in FIG. 4A and FIG. 4B show an example in which the UCI is first mapped to one symbol and a "frequency domain first" mapping manner is used. B in FIG. 4A and FIG. 4B shows that locations occupied by the UCI are relatively staggered from each other. A and B in FIG. 5A and FIG. 5B show a "time domain first" manner, and B in FIG. 5A and FIG. 5B shows that locations occupied by the UCI are relatively staggered from each other, in a case of a plurality of symbols, it can be further considered to perform specific offset between two symbols, to reduce impact on the data or the CSI when puncturing is performed for the ACK.

Manner 2: There is a limitation in frequency domain and there is an increase in time domain.

A quantity of symbols to which the UCI is mapped on a frequency domain resource is less than or equal to a fourth preset value and a quantity of symbols to which the UCI is mapped on a time domain resource is related to a UCI type. The fourth preset value is one or more of the following values: a preset quantity of REs, a value related to the quantity of symbols of the PUSCH, a value related to a bandwidth of the PUSCH, a value related to a phase tracking reference signal (PTRS) of the PUSCH, and the like.

Figure 6:
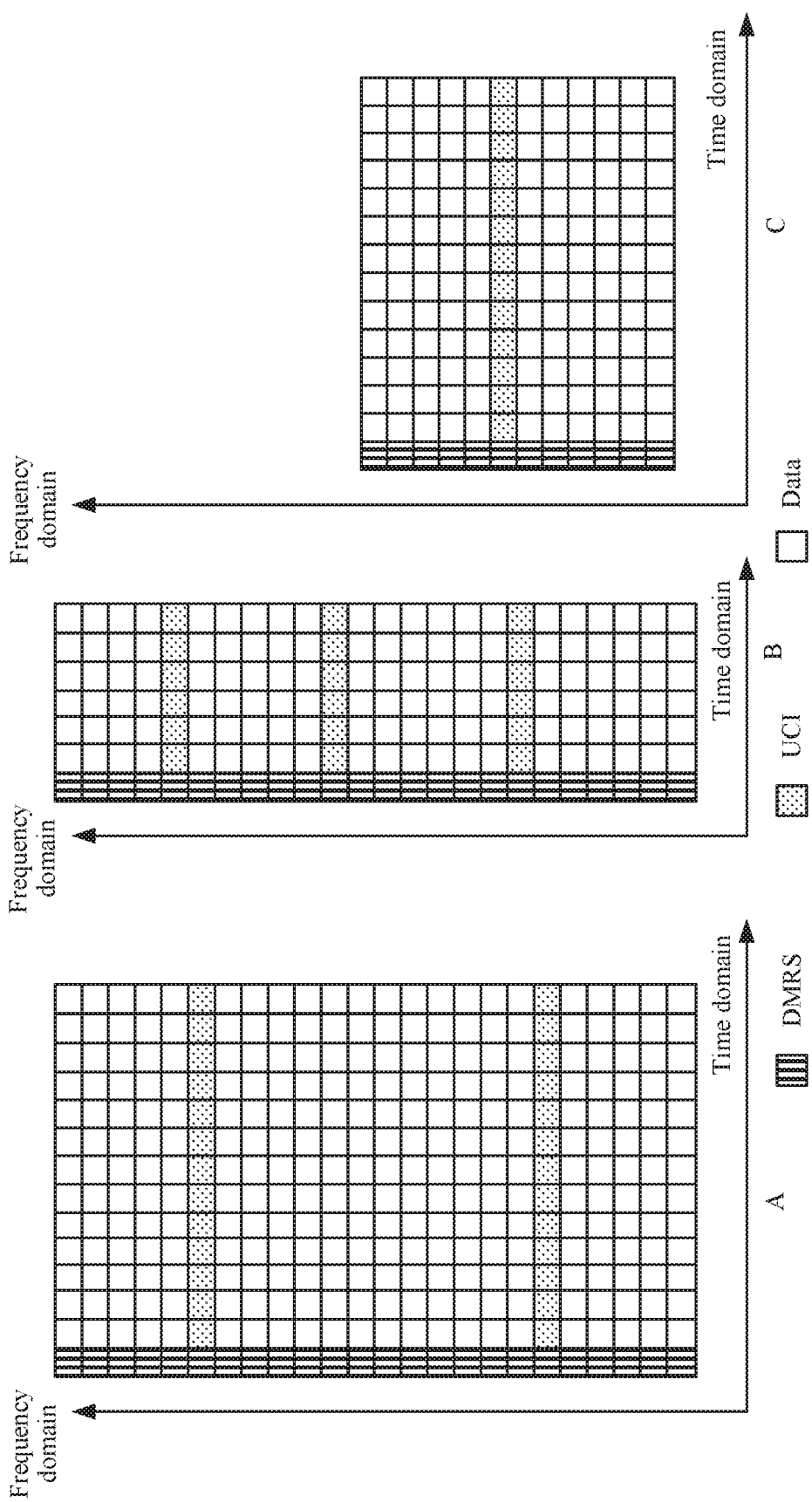
FIG. 6 is a schematic diagram of resource mapping according to this application.

The fourth preset value may be the preset quantity of REs. As shown in A in FIG. 6, the preset quantity of REs may be a fixed value that is set based on experience, and the value indicates several REs, for example, may be 2, 3, or 4. In this case, the value of C is a product of the quantity of REs and a quantity of symbols in time domain.

The fourth preset value may be the value related to the quantity of symbols of the PUSCH. As shown in B in FIG. 6, When the quantity of symbols is relatively small, the value is relatively large. For example, when the PUSCH is 14 symbols, the value indicates two REs; when the PUSCH is 7 symbols, the value indicates four REs. A frequency domain location of an RE in the PUSCH may be predefined, for example, may be an RE on a bandwidth edge, or may be REs in some RBs of some RBGs, where the RBG is bandwidth-related. For example, when the PUSCH is 14 symbols, the value indicates two REs, and the value of C is a product of the RE quantity 2 and a quantity of symbols in time domain.

The fourth preset value may be the value related to the bandwidth of the PUSCH. As shown in C in FIG. 6, when the bandwidth is relatively large, the value is relatively large. When the PUSCH is one RB, the value indicates one RE. When the PUSCH is two RBs, the value indicates two REs. Specifically, the fourth preset value may be alternatively related to a frequency domain discrete granularity, for example, an RB, an RBG, a PRG, or a subband. For example, when the PUSCH is one RB, the value indicates one RE, and the value of C is a product of the RE quantity 1 and a quantity of symbols in time domain.

Figure 7:
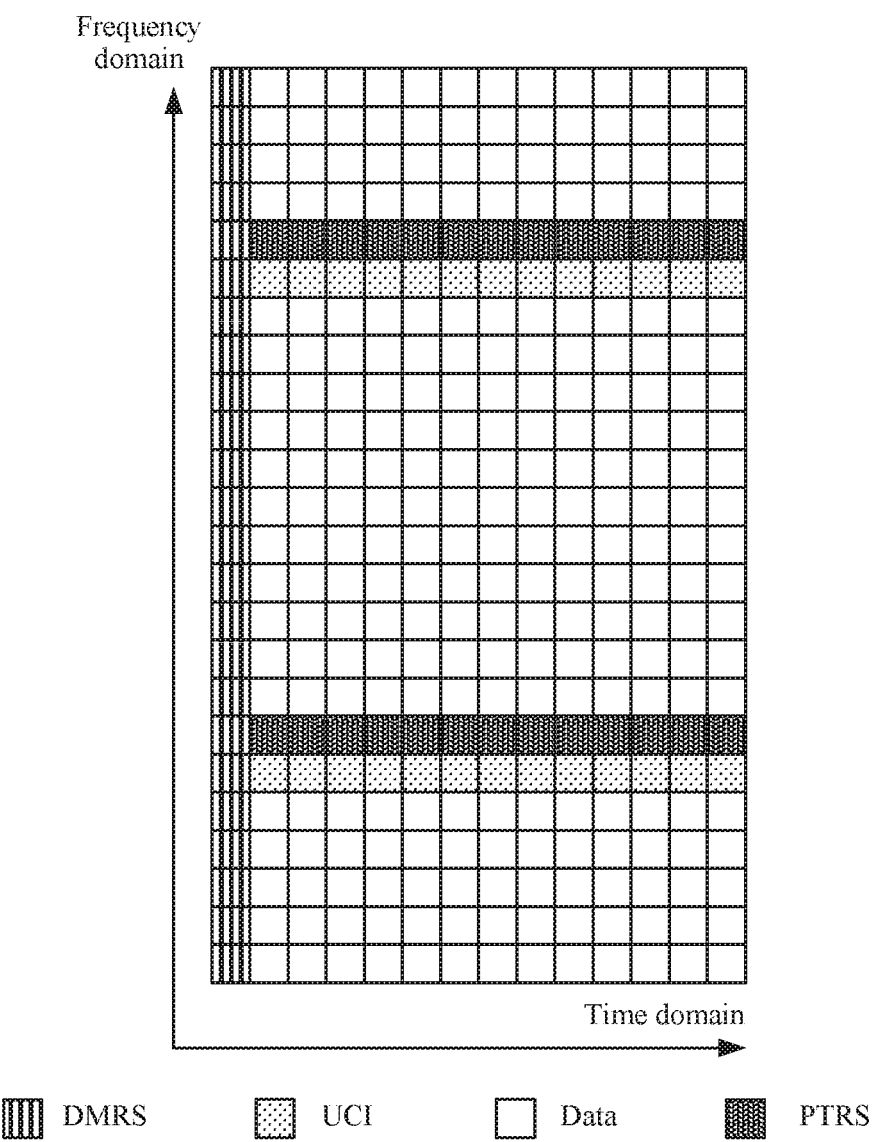
FIG. 7 is a schematic diagram of resource mapping according to this application.

The fourth preset value may be the value related to the PTRS of the PUSCH. When there is a PTRS, a location near the PTRS may be selected as a location of the RE, to achieve a relatively good frequency offset correction and channel estimation effect. When there are a plurality of PTRSs, REs of a same quantity as the PTRSs are selected, and details may be shown in FIG. 7. A location occupied by the PTRS is not an available resource of the UCI.

It should be noted that in these cases, the value of C in the foregoing Formulas (1) to (5) is a product of a quantity of REs in frequency domain and a quantity of symbols in time domain.

Optionally, the UCI may also be discretely mapped in time domain, and a unit of discrete distribution may be a mini-slot, or a slot aggregation.

Figure 8A:
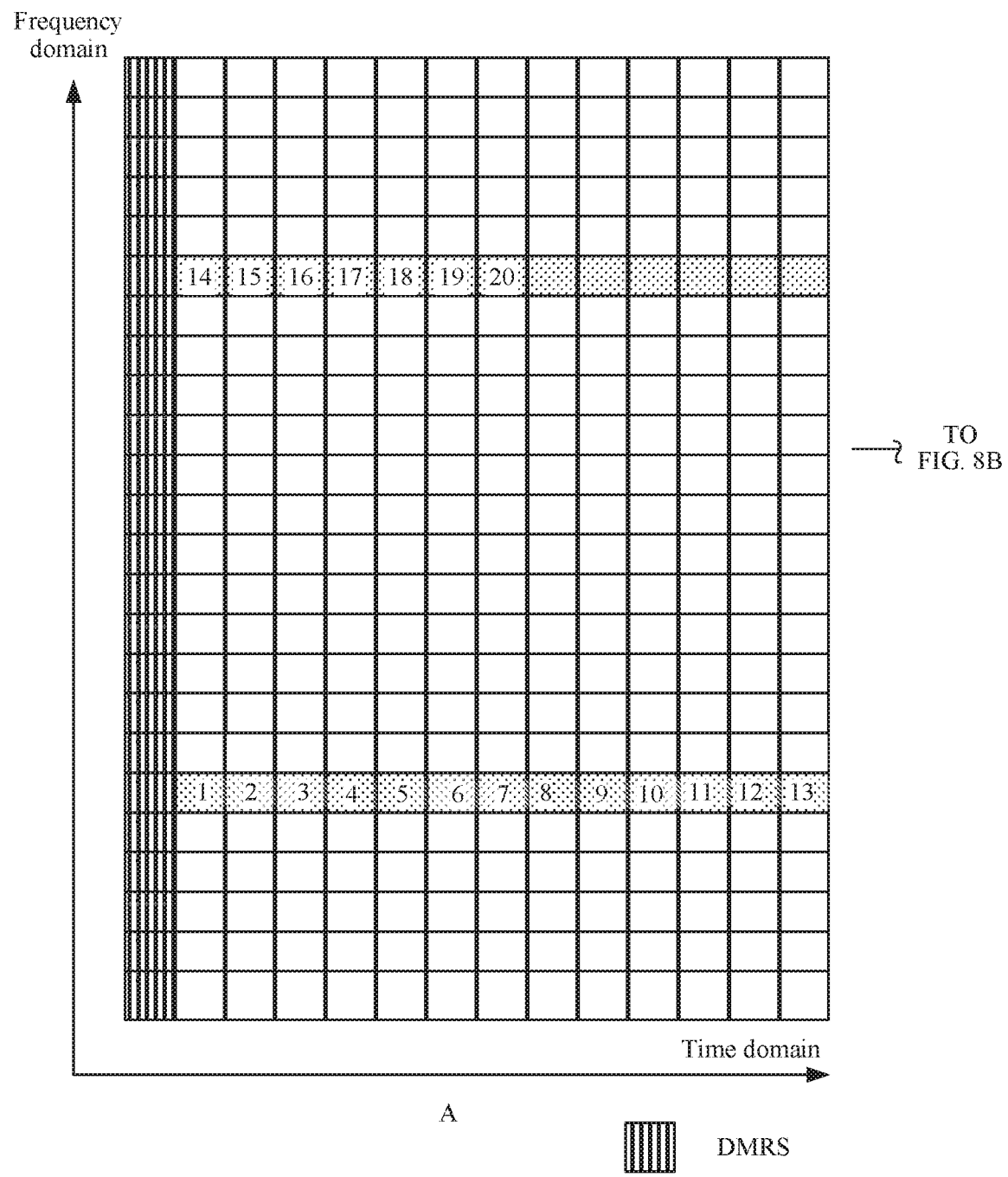
FIG. 8A and FIG. 8B are a schematic diagram of resource mapping according to this application.
Figure 8B:
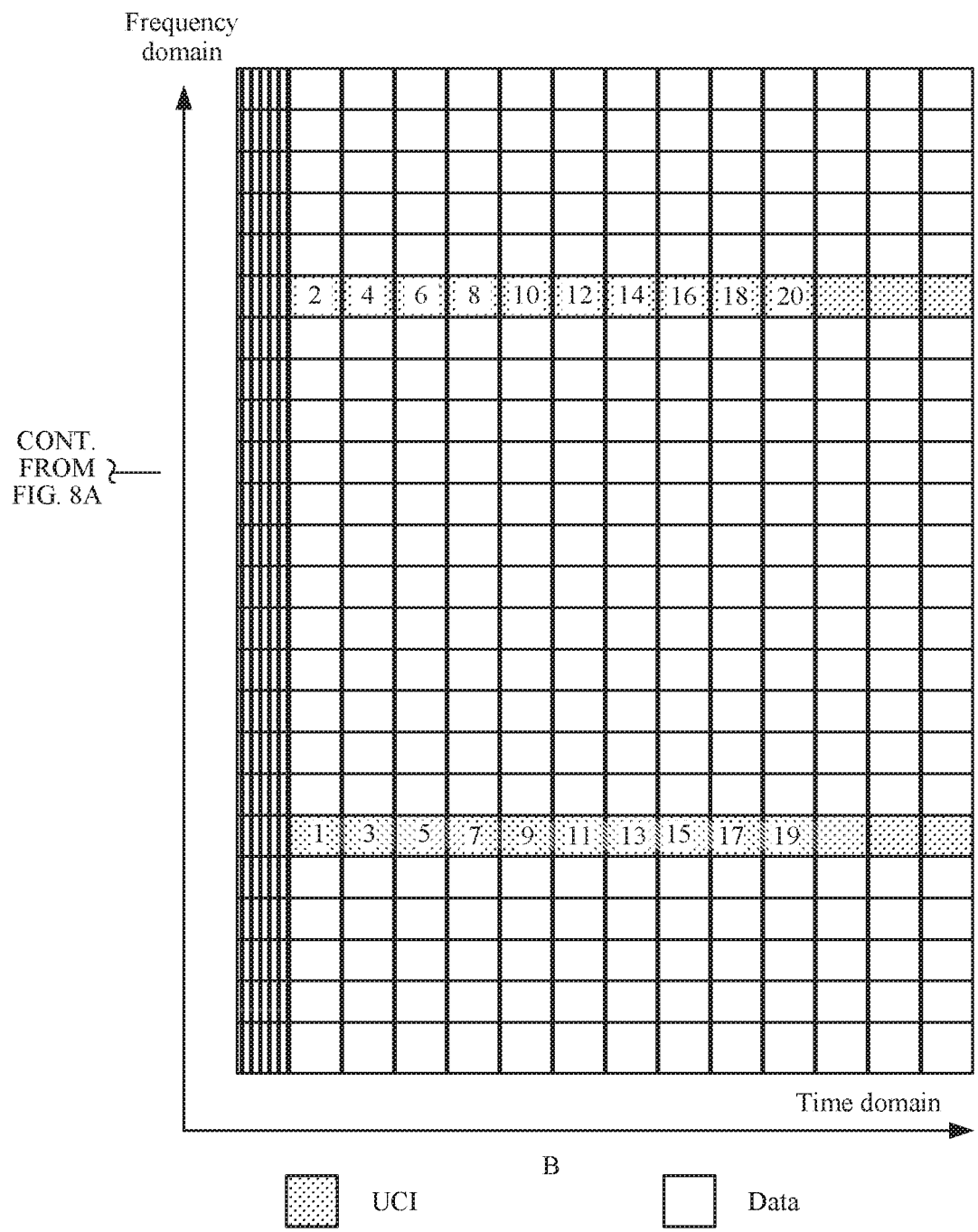

For a specific RE mapping sequence, there are two kinds of considerations in A and B in FIG. 8A and FIG. 8B: "frequency domain first" and "time domain first". "Frequency domain first" corresponds to B in FIG. 8B, and "time domain first" corresponds to A in FIG. 8A.

It should be noted that the UCI in this application may be any type of UCI, and may be the HARQ-ACK, the CSI part 1, or the CSI part 2. Optionally, the UCI is the CSI part 1 or the ACK.

Mapping manners of the ACK and the CSI part 1 may be kept consistent. When both the ACK and the CSI part 1 exist, an available resource may be further evenly allocated. For example, for the RBG in Manner 1, the CSI part 1 is mapped to a resource whose RBG number is an odd number, and the ACK is mapped to a resource whose RBG number is an even number. Within an odd-numbered resource and an even-numbered resource, allocation is further performed based on the description of Manner 1.

For another example, in Manner 2, a quantity of REs in frequency domain is also evenly allocated, an odd-numbered available RE is used for the CSI part 1, and an even-numbered available RE is used for the ACK. Keeping the mapping manners of the ACK and the CSI part 1 consistent helps simplify a protocol.

Further, to transmit the CSI part 2, multiplexing may be performed for the CSI part 2 and the data. Because a "frequency domain first" mapping manner is used for the data, the CSI part 2 needs to be mapped after multiplexing is performed for the CSI part 2 and the data.

In a simple manner, if the HARQ-ACK is mapped in a puncturing manner, after mapping for the CSI part 1 ends, the CSI part 2 is placed in front of the data, and then the CSI part 2 is mapped in the "frequency domain first" manner together with the data. The CSI part 1 needs to be skipped in the mapping process.

Figure 9A:
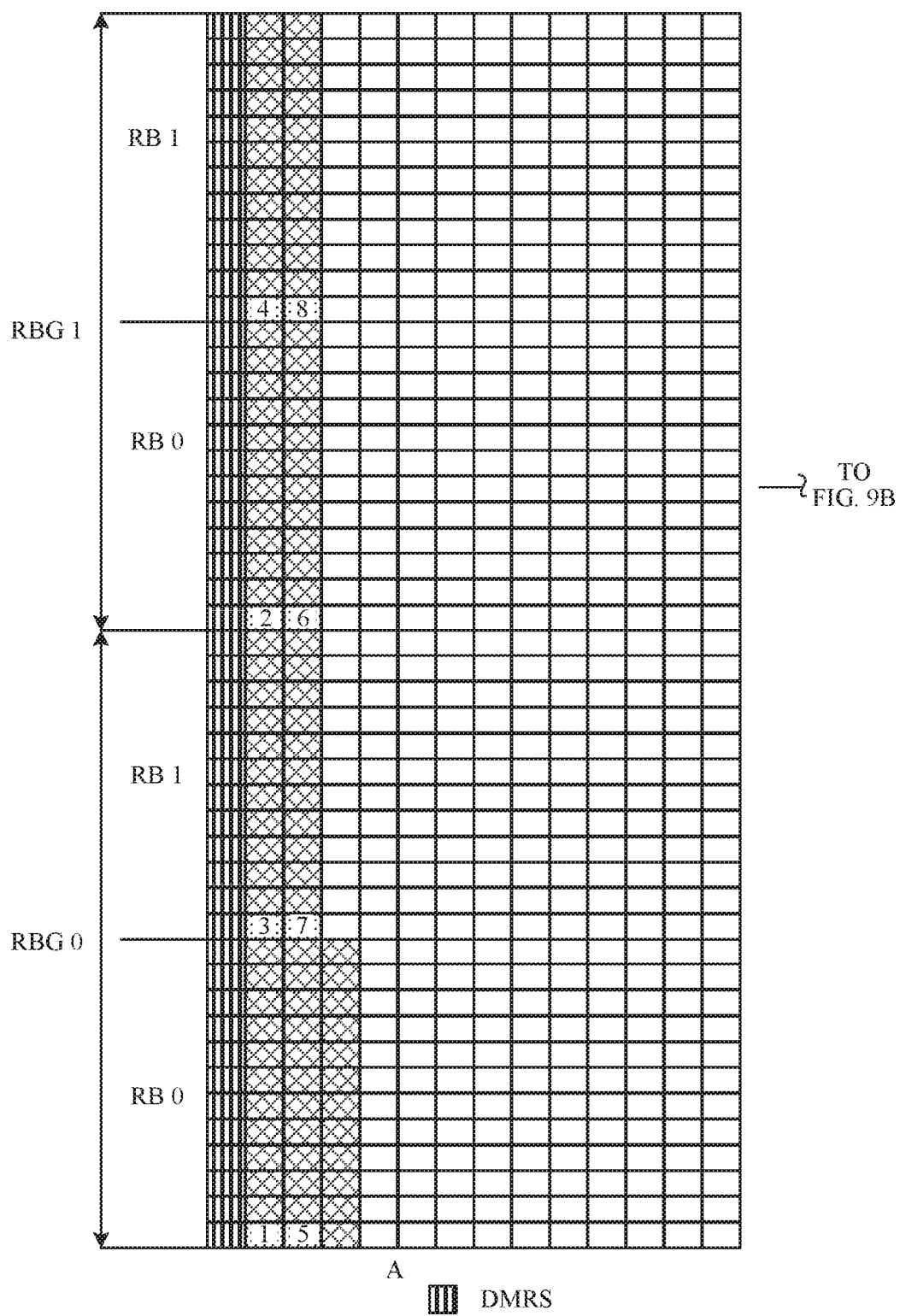
FIG. 9A to FIG. 9C are a schematic diagram of resource mapping according to this application.

If the HARQ-ACK is mapped in a rate matching manner, after both mapping for the HARQ-ACK and mapping for the CSI part 1 end, the CSI part 2 and the data start to be mapped, as shown in A in FIG. 9A. During mapping, locations occupied by the HARQ-ACK and the CSI part 1 need to be skipped for the CSI part 2.

Figure 9B:
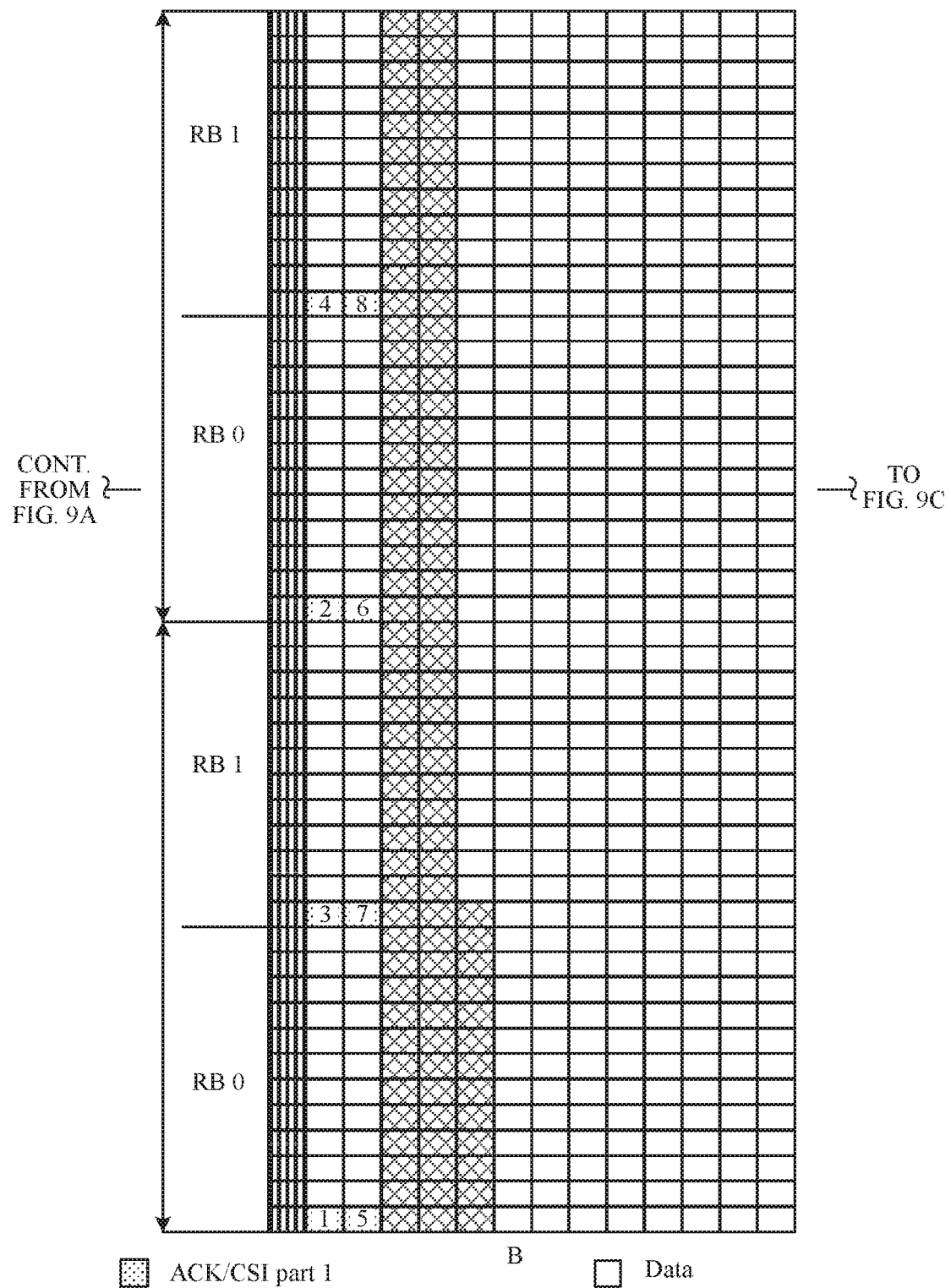

B in FIG. 9B shows that after the CSI part 1 and the ACK are mapped, the CSI part 2 is mapped and symbols occupied by the CSI part 1 and the ACK are skipped during mapping for the CSI part 2; and then, the data is mapped. During mapping, the symbols occupied by the CSI part 1 and the ACK need to be skipped for the CSI part 2.

Figure 9C:
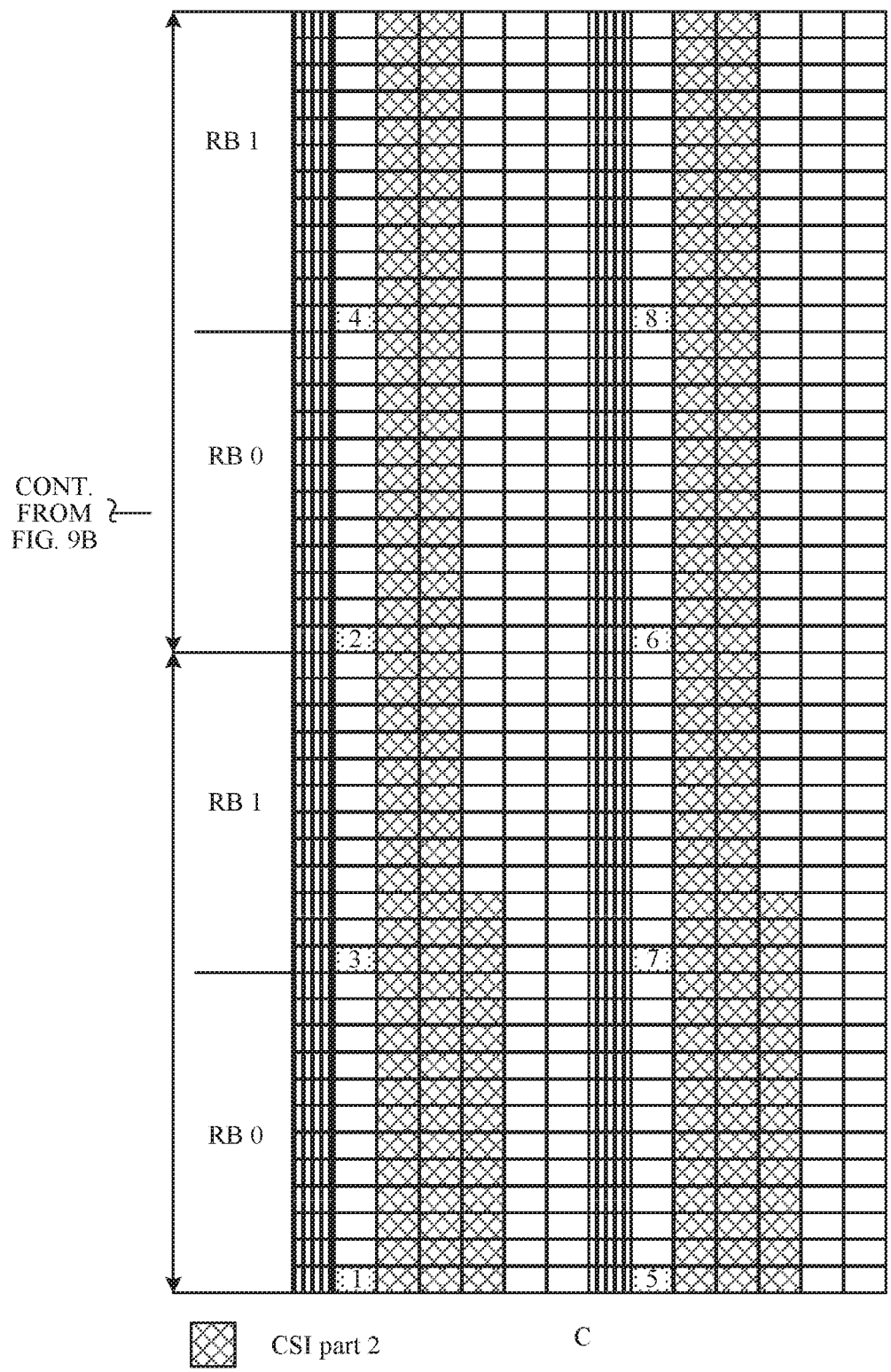

C in FIG. 9C shows that a two-part mapping method is used in a case of frequency hopping. Mapping is performed in "time domain first" on two parts of resources.

Figure 10A:
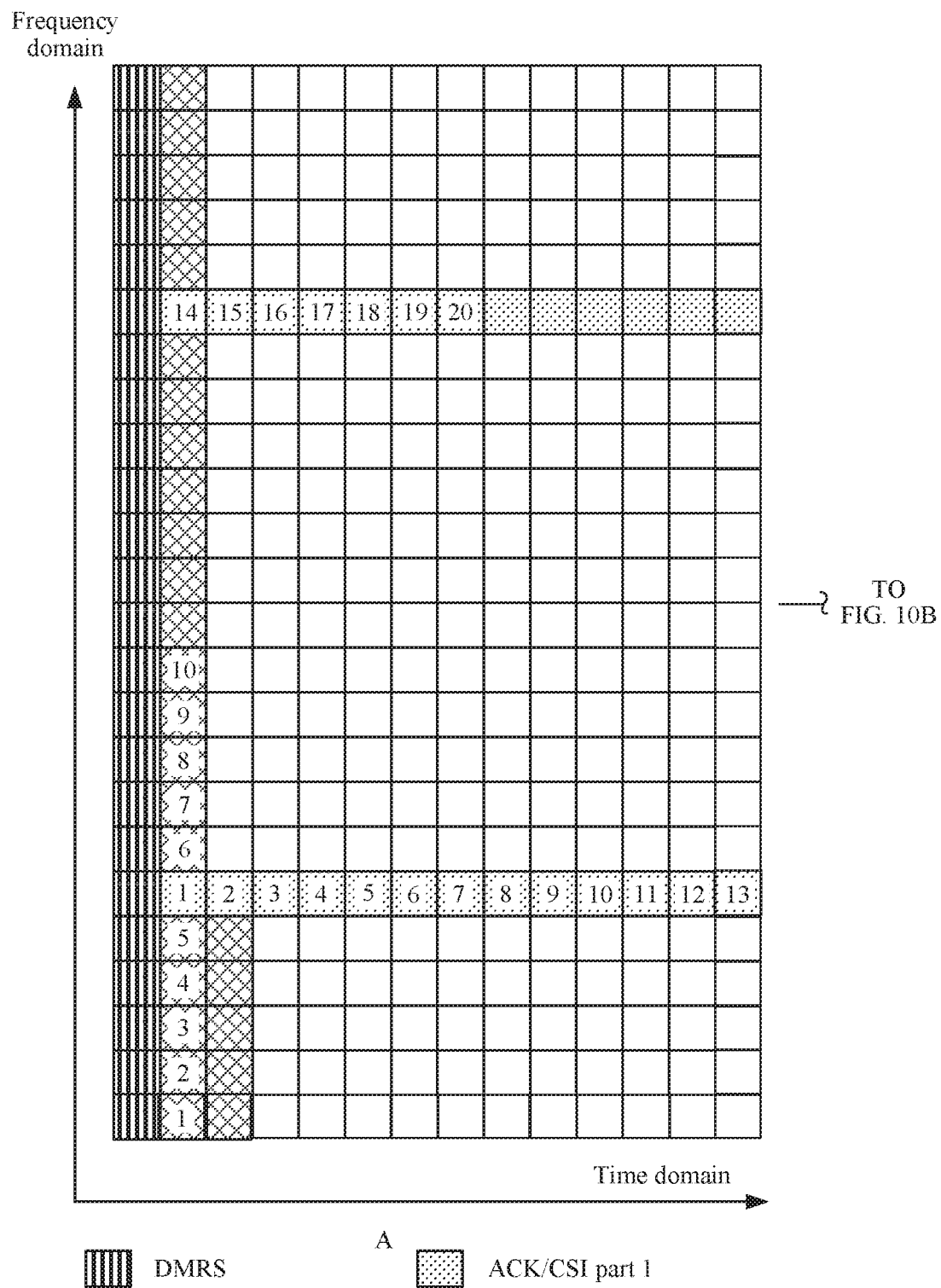
FIG. 10A and FIG. 10B are a schematic diagram of resource mapping according to this application.
Figure 10B:
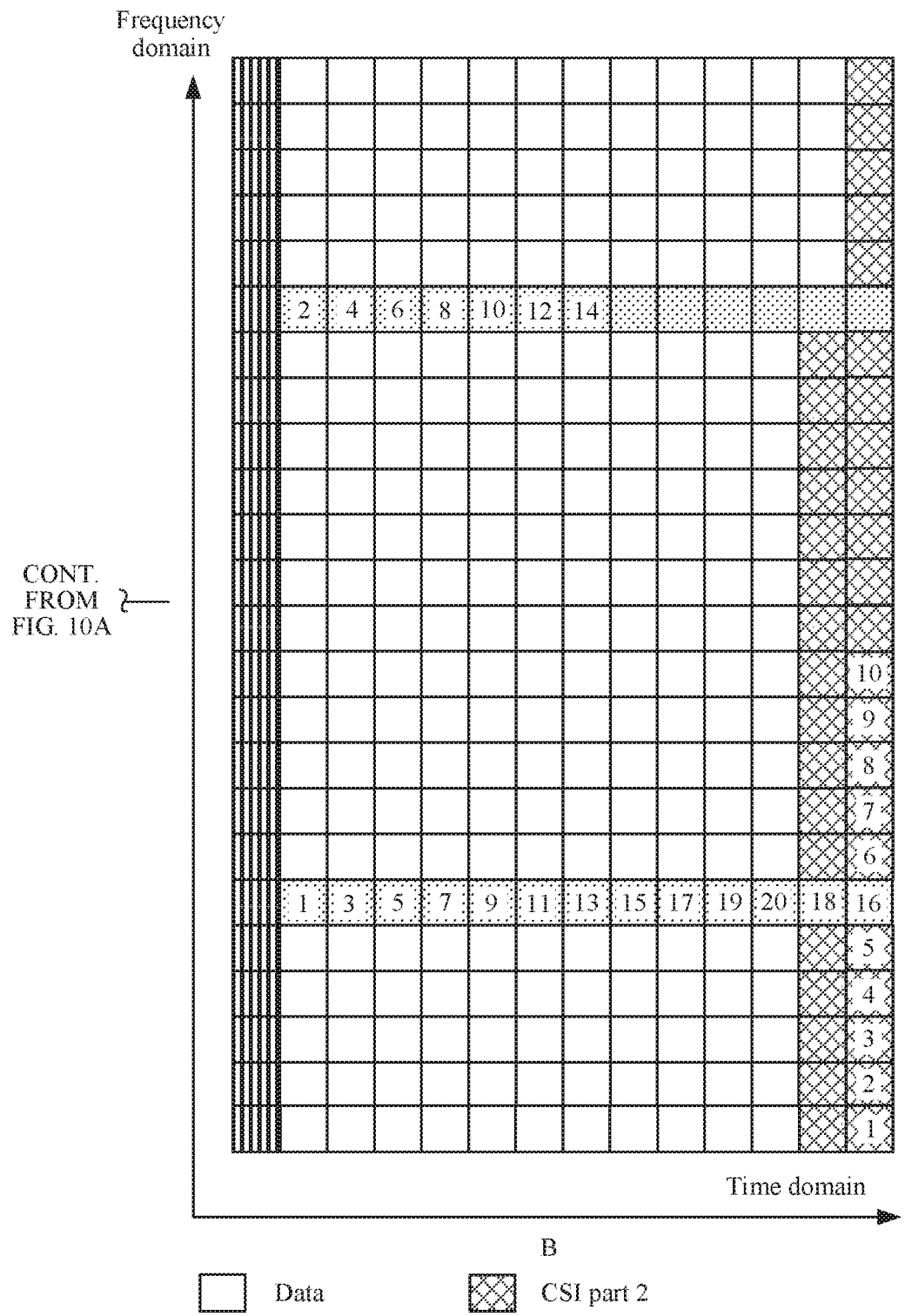

When the mapping manner in Manner 2 is used, a mapping manner of the CSI part 2 may be shown in FIG. 10A and FIG. 10B.

Optionally, because the network device may control the UCI to be within a configured resource, the foregoing Formulas (1) to (4) may be simplified. Specifically, the terminal device may determine, according to the following Formula (6), Formula (7), Formula (8), or Formula (9), the quantity of resources for sending the UCI.

Formula (6) is:

$$Q' = \left\lceil \frac{O \cdot A \cdot \beta_{offset}^{PUSCH}}{B+O} \right\rceil, \qquad (6)$$

where $Q'$ is the quantity of resources for sending the UCI, $O$ is the quantity of bits of the UCI, $B$ is the quantity of bits of the data, $A$ is a quantity of available resources of the data during initial transmission, and $\beta_{offset}^{PUSCH}$ is an offset of the UCI relative to a reference code rate.

Formula (7) is:

$$Q' = \left\lceil \frac{O \cdot A}{B + \beta_{offset}^{PUSCH} O} \right\rceil, \qquad (7)$$

where $Q'$ is the quantity of resources for sending the UCI, $O$ is the quantity of bits of the UCI, $B$ is the quantity of bits of the data, $A$ is a quantity of available resources of the data during initial transmission, and $\beta_{offset}^{PUSCH}$ is a preset offset.

Formula (8) is:

$$Q' = \left\lceil \frac{\beta_{offset}^{PUSCH} O \cdot A}{B + \beta_{offset}^{PUSCH} O} \right\rceil, \qquad (8)$$

where $Q'$ is the quantity of resources for sending the UCI, $O$ is the quantity of bits of the UCI, $B$ is the quantity of bits of the data, $A$ is a quantity of available resources of the data during initial transmission, and $\beta_{offset}^{PUSCH}$ is a preset offset.

Formula (9) is:

$$Q' = \lceil O \cdot \beta_{offset}^{PUSCH} \cdot R \rceil \qquad (9),$$

where $Q'$ is the quantity of resources for sending the UCI, $O$ is the quantity of bits of the UCI, $R$ is the code rate of the data, and $\beta_{offset}^{PUSCH}$ is a preset offset.

The parameters in the foregoing Formulas (6) to (9) have been already explained in the foregoing embodiment, and details are not described herein.

It is indicated in the foregoing embodiment that, the terminal device determines, based on the first information, the quantity of resources for sending the UCI, where the first information includes any one of the following information combinations: a combination of scheduling information, a ratio of a quantity of bits of the UCI to a sum of the quantity of bits of the UCI and a quantity of bits of data, a first preset parameter, a parameter β, and a quantity of available resources of a PUSCH; a combination of scheduling information, a parameter β, quantity of available resources of a PUSCH, and a code rate of scheduled data; or a combination of scheduling information, a ratio of a quantity of bits of the UCI to a quantity of bits of data, a first preset parameter, a parameter β, a quantity of available resources of a PUSCH, and a parameter α; and the terminal device sends the UCI to the network device based on the determined quantity of resources for sending the UCI. Because the terminal device uses the ratio of the quantity of bits of the UCI to the quantity of bits of the data as a proportion baseline for resource division when determining the quantity of resources for sending the UCI, a case in which all resources are allocated to the UCI during initial transmission and the data cannot be transmitted can be avoided.

Figure 11:
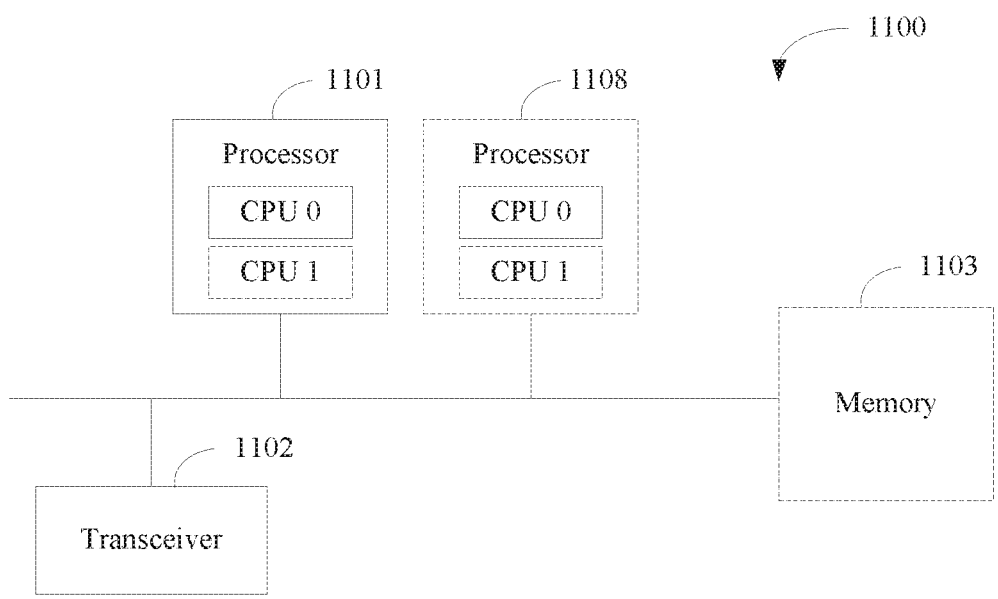
FIG. 11 is a schematic structural diagram of an uplink control information transmission apparatus according to this application.

Based on a same technical concept, FIG. 11 is a schematic diagram of an apparatus according to this application. The apparatus may be a terminal device, and may perform the method performed by the terminal device in any one of the foregoing embodiments.

The terminal device 1100 includes at least one processor 1101 and a transceiver 1102, and optionally further includes a memory 1103. The processor 1101, the transceiver 1102, and the memory 1103 are connected to each other.

The processor 1101 may be a general-purpose central processing unit, a microprocessor, an application-specific integrated circuit, or one or more integrated circuits configured to control program execution in the embodiments of this application.

The transceiver 1102 is configured to communicate with another device or a communications network, and the transceiver includes a radio frequency circuit.

The memory 1103 may be a read-only memory or another type of static storage device that can store static information and an instruction, a random access memory or another type of dynamic storage device that can store information and an instruction, or may be an electrically erasable programmable read-only memory, a compact disc read-only memory or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or data structure and that can be accessed by a computer. However, the memory 1103 is not limited thereto. The memory 1103 may exist independently, and is connected to the processor 1101. Alternatively, the memory 1103 may be integrated into the processor. The memory 1103 is configured to store application program code for executing the embodiments of this application, and the execution is controlled by the processor 1101. The processor 1101 is configured to execute the application program code stored in the memory 1103.

During specific implementation, in an embodiment, the processor 1101 may include one or more CPUs, such as a CPU 0 and a CPU 1 in FIG. 11.

During specific implementation, in an embodiment, the terminal device 1100 may include a plurality of processors, such as the processor 1101 and a processor 1108 in FIG. 11. Each of the processors may be a single-core (single-CPU) processor, or may be a multi-core (multi-CPU) processor. Herein, the processor may be one or more devices, circuits, and/or processing cores for processing data (for example, a computer program instruction).

It should be understood that the terminal device may be configured to implement the steps performed by the terminal device in the uplink control information transmission method provided in this application. For related features, refer to the foregoing descriptions. Details are not described herein.

Figure 12:
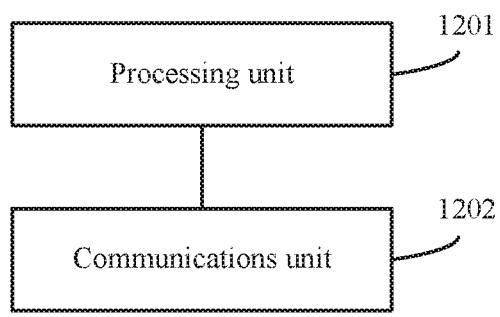
FIG. 12 is a schematic structural diagram of an uplink control information transmission apparatus according to this application.

In this application, the terminal device may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in this application, the module division is an example, and is merely logical function division. During actual implementation, there may be another division manner. For example, when function modules are obtained through division based on corresponding functions, FIG. 12 is a schematic diagram of an apparatus. The apparatus may be the terminal device in the foregoing embodiments. The apparatus includes a processing unit 1201 and a communications unit 1202.

The processing unit 1201 is configured to determine, based on first information, a quantity of resources for sending UCI. The first information includes any one of the following information combinations: a combination of scheduling information, a ratio of a quantity of bits of the UCI to a sum of the quantity of bits of the UCI and a quantity of bits of data, a first preset parameter, a parameter β, and a quantity of available resources of a PUSCH; a combination of scheduling information, a first preset parameter, a parameter β, a quantity of available resources of a PUSCH, and a code rate of scheduled data, or a combination of scheduling information, a ratio of a quantity of bits of the UCI to a quantity of bits of data, a first preset parameter, a parameter β, a quantity of available resources of a PUSCH, and a parameter α.

The communications unit 1202 is configured to send the UCI to a network device based on the quantity of resources that is for sending the UCI and that is determined by the processing unit 1201.

Optionally, the first preset parameter is a product of a first preset value and a quantity of frequency domain resource elements REs scheduled for the PUSCH anchor a product of a second preset value and a quantity of symbols of the PUSCH.

Optionally, the first preset value is a bandwidth and/or a quantity of symbols.

Optionally, the processing unit 1201 is specifically configured to:

determine, according to Formula (1), Formula (2), Formula (3), Formula (4), or Formula (5), the quantity of resources for sending the UCI.

Formula (1) is:

$$Q' = \min\left(\left\lceil \frac{O \cdot A \cdot \beta_{offset}^{PUSCH}}{B + O} \right\rceil, C\right), \tag{1}$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is an offset of the UCI relative to a reference code rate.

Formula (2) is:

$$Q' = \min\left(\left\lceil \frac{O \cdot A}{B + \beta_{offset}^{PUSCH} O} \right\rceil, C\right), \tag{2}$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset.

Formula (3) is:

$$Q' = \min\left(\left\lceil \frac{\beta_{offset}^{PUSCH} O \cdot A}{B + \beta_{offset}^{PUSCH} O} \right\rceil, C\right), \tag{3}$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, and $\beta_{offset}^{PUSCH}$ is a preset offset.

Formula (4) is:

$$Q' = \min(\lceil O \cdot \beta_{offset}^{PUSCH} \cdot R \rceil, C) \tag{4}$$

where

Q' is the quantity of resources for sending the UCI, O is the quantity of bits of the UCI, R is the code rate of the data, C is a maximum quantity of resources for transmitting the UCI in a quantity of scheduled available resources of the data during transmission, and $\beta_{offset}^{PUSCH}$ is a preset offset.

Formula (5) is:

$$Q' = \min\left(\left\lceil \frac{O \cdot A \cdot \beta_{offset}^{PUSCH}}{B} \right\rceil, \alpha C\right), \tag{5}$$

where

Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{offset}^{PUSCH}$ is an offset of the UCI relative to a reference code rate, and α is a parameter.

Optionally, a value of C is associated with a mapping manner of the UCI. The mapping manner of the UCI includes that a quantity of symbols to which the UCI is mapped on a time domain resource is less than or equal to a third preset value and a quantity of symbols to which the UCI is mapped on a frequency domain resource is related to a UCI type, or that a quantity of symbols to which the UCI is mapped on a frequency domain resource is less than or equal to a fourth preset value and a quantity of symbols to which the UCI is mapped on a time domain resource is related to a UCI type.

Optionally, the third preset value is one or more of the following values:

a preset quantity of symbols near a demodulation reference signal DMRS, a value related to the quantity of symbols of the PUSCH, a value related to whether the PUSCH supports frequency hopping, and a value related to whether an additional DMRS is supported.

Optionally, the fourth preset value is one or more of the following values:

a preset quantity of resource elements REs, a value related to the quantity of symbols of the PUSCH, a value related to a bandwidth of the PUSCH, and a value related to a phase tracking reference signal PTRS of the PUSCH.

It should be understood that the terminal device may be configured to implement the steps performed by the terminal device in the uplink control information transmission method in this application. For related features, refer to the foregoing descriptions. Details are not described herein.

This application further provides a communications apparatus, including a processing element and a storage element. The storage element is configured to store a program, and when the program is invoked by the processing element, the communications apparatus is configured to perform the foregoing uplink control information transmission method.

This application further provides a computer storage medium, configured to store a computer software instruction used by the foregoing network device or terminal device, and the computer storage medium includes program code designed to execute the foregoing method embodiments.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. Moreover, the embodiments of the present application may use a form of a computer program product that is implemented on one or more computer-usable storage media (including but not limited to a magnetic disk memory, a CD-ROM, an optical memory, and the like) that include computer-usable program code.

The embodiments of the present application are described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to the embodiments of the present application without departing from the spirit and scope of this application. In this way, this application is intended to include these modifications and variations of the embodiments of the present application provided that they fall within the scope of the claims of this application and their equivalent technologies.

What is claimed is:

1. A method, comprising:
    determining, based on first information, a quantity of resources for sending uplink control information (UCI), wherein the first information comprises scheduling information, a ratio of a quantity of bits of the UCI to a quantity of bits of data, a first preset parameter, a parameter β, a quantity of available resources of a physical uplink shared channel (PUSCH), and a parameter α, wherein the parameter β is an offset of the UCI, and wherein the parameter a is configured by higher layer signaling and the parameter α is less than 1; and
    sending the UCI to a network device based on the determined quantity of resources for sending the UCI.

2. The method according to claim 1, wherein the first preset parameter is at least one of following:
    a product of a first preset value and a quantity of frequency domain resource elements (REs) scheduled for the PUSCH; or
    a product of a second preset value and a quantity of symbols of the PUSCH.

3. The method according to claim 2, wherein the first preset value is at least one of a bandwidth or a quantity of symbols.

4. The method according to claim 1, wherein the quantity of resources for sending the UCI satisfies:

$$Q' = \min\left(\left\lceil \frac{O \cdot A \cdot \beta_{\textit{offset}}^{PUSCH}}{B} \right\rceil, \alpha C\right),$$

wherein:
    Q' is the quantity of resources for sending the UCI, P is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{\textit{offset}}^{PUSCH}$ is an offset of the UCI relative to a reference code rate, and α is a parameter.

5. The method according to claim 1, wherein the UCI includes at least one of hybrid automatic repeat request-acknowledgement (HARQ-ACK) information or channel state information (CSI).

6. The method according to claim 1, wherein the method is performed by a terminal or a chip.

7. An apparatus, comprising:
one or more processors; and
a memory coupled to the one or more processors, wherein the memory stores a program to be executed by the one or more processors, and wherein the program, when executed by the one or more processors, instructs the one or more processors to perform operations comprising:
  determining, based on first information, a quantity of resources for sending uplink control information (UCI), wherein the first information comprises scheduling information, a ratio of a quantity of bits of the UCI to a quantity of bits of data, a first preset parameter, a parameter β, a quantity of available resources of a physical uplink shared channel (PUSCH), and a parameter α, wherein the parameter β is an offset of the UCI, and wherein the parameter α is configured by higher layer signaling and the parameter α is less than 1; and
  sending the UCI to a network device based on the determined quantity of resources for sending the UCI.

8. The apparatus according to claim 7, wherein the first preset parameter is at least one of following:
  a product of a first preset value and a quantity of frequency domain resource elements (REs) scheduled for the PUSCH; or
  a product of a second preset value and a quantity of symbols of the PUSCH.

9. The apparatus according to claim 8, wherein the first preset value is at least one of a bandwidth or a quantity of symbols.

10. The apparatus according to claim 7, wherein the quantity of resources for sending the UCI satisfies:

$$Q' = \min\left(\left\lceil \frac{O \cdot A \cdot \beta_{offset}^{PUSCH}}{B} \right\rceil, \alpha C\right),$$

wherein:
Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled scheduled available resources of the data during transmission, $\beta_{offset}^{PUSCH}$ is an offset of the UCI relative to a reference code rate, and α is a parameter.

11. The apparatus according to claim 7, wherein the UCI includes at least one of hybrid automatic repeat request-acknowledgement (HARQ-ACK) information or channel state information (CSI).

12. The apparatus according to claim 7, wherein the apparatus is a terminal or a chip.

13. A non-transitory computer readable medium, wherein the non-transitory computer readable medium stores instructions that are executable by a computer, and wherein the instructions, when executed by the computer, cause the computer to perform operations comprising:
  determining, based on first information, a quantity of resources for sending uplink control information (UCI), wherein the first information comprises scheduling information, a ratio of a quantity of bits of the UCI to a quantity of bits of data, a first preset parameter, a parameter β, a quantity of available resources of a physical uplink shared channel (PUSCH), and a parameter α, wherein the parameter β is an offset of the UCI, and wherein the parameter α is configured by higher layer signaling and the parameter α is less than 1; and
  sending the UCI to a network device based on the determined quantity of resources for sending the UCI.

14. The non-transitory computer readable medium according to claim 13, wherein the first preset parameter is at least one of following:
  a product of a first preset value and a quantity of frequency domain resource elements (REs) scheduled for the PUSCH; or
  a product of a second preset value and a quantity of symbols of the PUSCH.

15. The non-transitory computer readable medium according to claim 14, wherein the first preset value is at least one of a bandwidth or a quantity of symbols.

16. The non-transitory computer readable medium according to claim 13, wherein the quantity of resources for sending the UCI satisfies:

$$Q' = \min\left(\left\lceil \frac{O \cdot A \cdot \beta_{offset}^{PUSCH}}{B} \right\rceil, \alpha C\right),$$

wherein:
Q' is the quantity of resources for sending the UCI, O is the quantity of bits of the UCI, B is the quantity of bits of the data, A is a quantity of available resources of the data during initial transmission, C is a maximum quantity of resources for transmitting the UCI in a quantity of scheduled available resources of the data during transmission, $\beta_{offset}^{PUSCH}$ is an offset of the UCI relative to a reference code rate, and α is a parameter.

17. The non-transitory computer readable medium according to claim 13, wherein the UCI includes at least one of hybrid automatic repeat request-acknowledgement (HARQ-ACK) information or channel state information (CSI).

* * * * *

UNITED STATES PATENT AND TRADEMARK OFFICE
CERTIFICATE OF CORRECTION

PATENT NO. : 11,317,387 B2
APPLICATION NO. : 16/871590
DATED : April 26, 2022
INVENTOR(S) : Li et al.

Page 1 of 1

It is certified that error appears in the above-identified patent and that said Letters Patent is hereby corrected as shown below:

In the Specification

In Column 1 Line 8, delete "No," and insert -- No. --.

In the Claims

In Column 24 Line 54, In Claim 4, delete "P" and insert -- O --.

In Column 25 Line 47 (Approx.), In Claim 10, delete "scheduled scheduled" and insert -- scheduled --.

In Column 26 Line 14 (Approx.), In Claim 13, delete "a," and insert -- α, --.

Signed and Sealed this
Nineteenth Day of July, 2022

Katherine Kelly Vidal
*Director of the United States Patent and Trademark Office*